United States Patent
Tanaka et al.

(10) Patent No.: US 12,118,304 B2
(45) Date of Patent: Oct. 15, 2024

(54) DIFFERENCE EXTRACTION DEVICE, METHOD AND PROGRAM

(71) Applicant: KABUSHIKI KAISHA TOSHIBA, Tokyo (JP)

(72) Inventors: Daiki Tanaka, Tokyo (JP); Takehiko Kagoshima, Kanagawa (JP); Kenji Iwata, Tokyo (JP); Hiroshi Fujimura, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 366 days.

(21) Appl. No.: 17/463,197

(22) Filed: Aug. 31, 2021

(65) Prior Publication Data

US 2022/0138420 A1 May 5, 2022

(30) Foreign Application Priority Data

Nov. 4, 2020 (JP) ................................. 2020-184610

(51) Int. Cl.
| | |
|---|---|
| G06F 40/268 | (2020.01) |
| G06F 40/232 | (2020.01) |
| G06F 40/30 | (2020.01) |
| G10L 13/08 | (2013.01) |
| G10L 15/02 | (2006.01) |
| G10L 15/06 | (2013.01) |
| G10L 15/183 | (2013.01) |
| G10L 15/22 | (2006.01) |

(52) U.S. Cl.
CPC .......... *G06F 40/268* (2020.01); *G06F 40/232* (2020.01); *G06F 40/30* (2020.01); *G10L 15/02* (2013.01); *G10L 15/063* (2013.01); *G10L 15/183* (2013.01); *G10L 15/22* (2013.01)

(58) Field of Classification Search
None
See application file for complete search history.

(56) References Cited

U.S. PATENT DOCUMENTS

| 10,535,339 B2 | 1/2020 | Fujimura | |
|---|---|---|---|
| 2006/0085187 A1* | 4/2006 | Barquilla | ................ G10L 15/01 704/243 |
| 2009/0024392 A1 | 1/2009 | Koshinaka | |

(Continued)

FOREIGN PATENT DOCUMENTS

| JP | H01154199 A | * | 6/1989 |
|---|---|---|---|
| JP | H0785040 A | * | 3/1995 |

(Continued)

OTHER PUBLICATIONS

English Machine Translation of JP-H01154199-A (Year: 1989).*

*Primary Examiner* — Richa Sonifrank
*Assistant Examiner* — Jean D. Aristilde
(74) *Attorney, Agent, or Firm* — Holtz, Holtz & Volek PC

(57) ABSTRACT

According to one embodiment, a difference extraction device includes processing circuitry. The processing circuitry acquires a text in which an input notation string is described. The processing circuitry converts the input notation string into a pronunciation string. The processing circuitry executes a pronunciation string conversion process in which the pronunciation string is converted into an output notation string. The processing circuitry extracts a difference by comparing the input notation string and the output notation string with each other.

9 Claims, 20 Drawing Sheets

(56) References Cited

U.S. PATENT DOCUMENTS

| | | | |
|---|---|---|---|
| 2013/0006629 A1* | 1/2013 | Honda | G10L 15/187 |
| | | | 704/E15.001 |
| 2014/0365217 A1 | 12/2014 | Fume et al. | |
| 2016/0379624 A1 | 12/2016 | Fujimura | |
| 2017/0263242 A1* | 9/2017 | Nagao | G10L 15/144 |
| 2023/0206896 A1* | 6/2023 | Kim | G10L 15/16 |
| | | | 704/259 |

FOREIGN PATENT DOCUMENTS

| | | | |
|---|---|---|---|
| JP | H11153998 A | | 6/1999 |
| JP | 2008058813 A | | 3/2008 |
| JP | 2014240884 A | | 12/2014 |
| JP | 2016091344 A | * | 5/2016 |
| JP | 2016164724 A | | 9/2016 |
| JP | 2017009842 A | | 1/2017 |
| JP | 6580882 B2 | | 9/2019 |
| WO | 2007097176 A1 | | 8/2007 |

\* cited by examiner

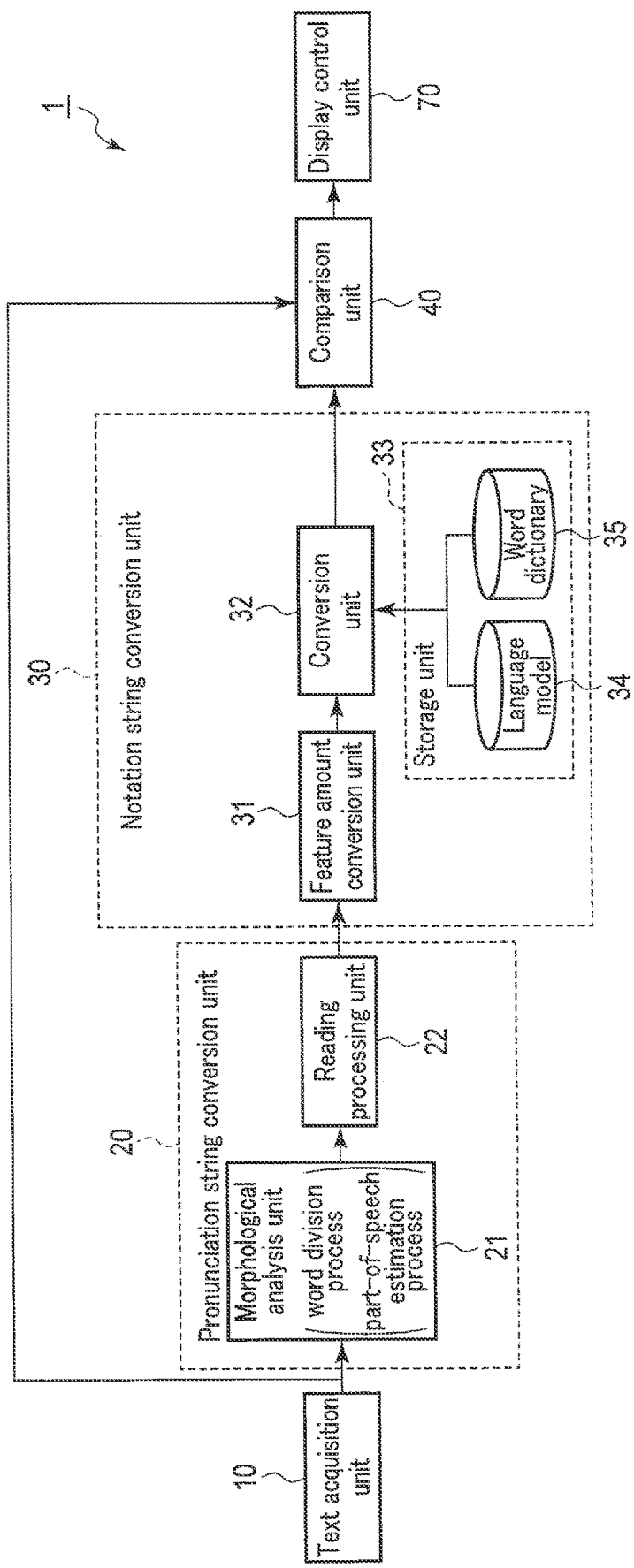
F I G. 1

Japanese syllables (example in which 102 syllables are shown):

| ア | イ | ウ | エ | オ | ヤ | ユ | ヨ |
|---|---|---|---|---|---|---|---|
| カ | キ | ク | ケ | コ | キャ | キュ | キョ |
| ガ | ギ | グ | ゲ | ゴ | ギャ | ギュ | ギョ |
| サ | シ | ス | セ | ソ | シャ | シュ | ショ |
| ザ | ジ | ズ | ゼ | ゾ | ジャ | ジュ | ジョ |
| タ | チ | ツ | テ | ト | チャ | チュ | チョ |
| ダ | | | デ | ド | | | |
| ナ | ニ | ヌ | ネ | ノ | ニャ | ニュ | ニョ |
| ハ | ヒ | フ | ヘ | ホ | ヒャ | ヒュ | ヒョ |
| パ | ピ | プ | ペ | ポ | ピャ | ピュ | ピョ |
| バ | ビ | ブ | ベ | ボ | ビャ | ビュ | ビョ |
| マ | ミ | ム | メ | モ | ミャ | ミュ | ミョ |
| ラ | リ | ル | レ | ロ | リャ | リュ | リョ |
| ワ | | | | | | | |
| ン | | | | | | | |
| ッ | | | | | | | |

ア (a), イ (i), ウ (u), エ (e), オ (o), ヤ (ya), ユ (yu), ヨ (yo),
カ (ka), キ (ki), ク (ku), ケ (ke), コ (ko), キャ (kya), キュ (kyu), キョ (kyo),
ガ (ga), ギ (gi), グ (gu), ゲ (ge), ゴ (go), ギャ (gya), ギュ (gyu), ギョ (gyo),
サ (sa), シ (shi), ス (su), セ (se), ソ (so), シャ (sha), シュ (shu), ショ (sho),
ザ (za), ジ (ji), ズ (zu), ゼ (ze), ゾ (zo), ジャ (ja), ジュ (ju), ジョ (jo),
タ (ta), チ (chi), ツ (tsu), テ (te), ト (to), チャ (cha), チュ (chu), チョ (cho),
ダ (da), デ (de), ド (do),
ナ (na), ニ (ni), ヌ (nu), ネ (ne), ノ (no), ニャ (nya), ニュ (nyu), ニョ (nyo),
ハ (ha, wa), ヒ (hi), フ (fu), ヘ (he), ホ (ho), ヒャ (hya), ヒュ (hyu), ヒョ (hyo),
パ (pa), ピ (pi), プ (pu), ペ (pe), ポ (po), ピャ (pya), ピュ (pyu), ピョ (pyo),
バ (ba), ビ (bi), ブ (bu), ベ (be), ボ (bo), ビャ (bya), ビュ (byu), ビョ (byo),
マ (ma), ミ (mi), ム (mu), メ (me), モ (mo), ミャ (mya), ミュ (myu), ミョ (myo),
ラ (ra), リ (ri), ル (ru), レ (re), ロ (ro), リャ (rya), リュ (ryu), リョ (ryo),
ワ (wa),
ン (n, m),
ッ (tt, kk, pp)

FIG. 7

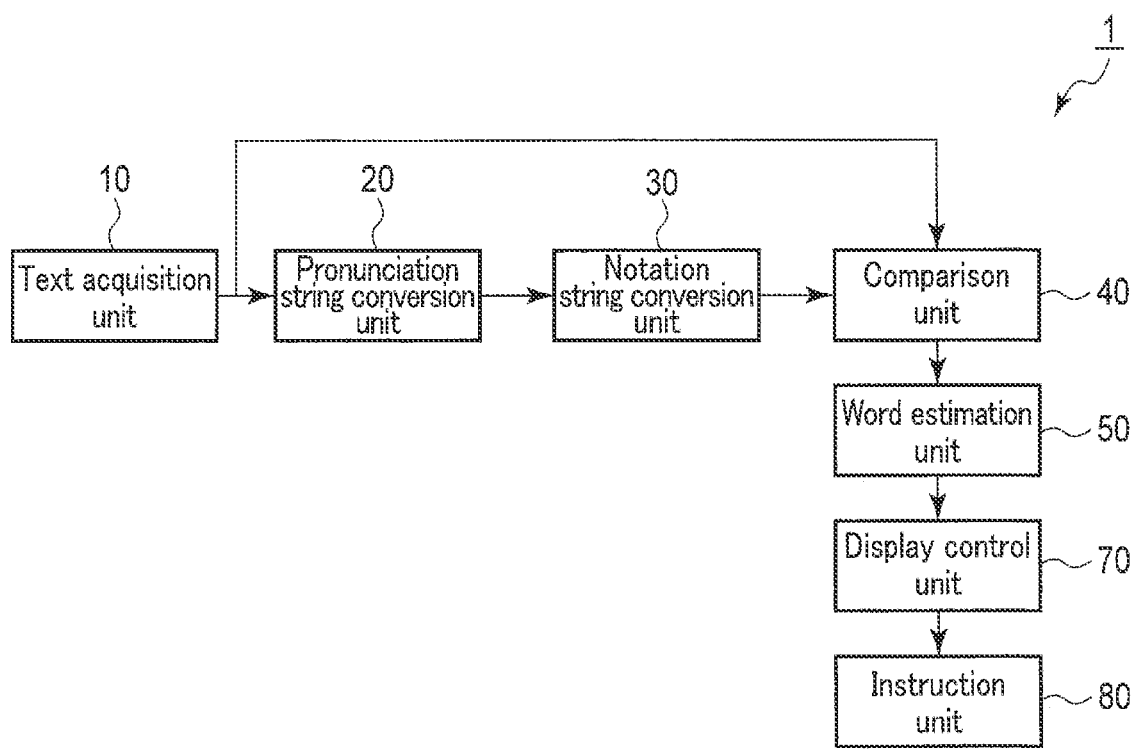
F I G. 11

| Word extraction | | Text reading |
|---|---|---|
| Input | Output | |
| 音声認識技術は深層学習の導入を契機として、近年の音声認識性能の向上により、応用分野が急速に拡大している。今後、音声認識技術の応用分野を拡大していくためには、遠隔マイクを用いた音声認識の精度向上が不可欠である。遠隔マイクは音声に比べて、口元のマイクで集音した音声に比べて、雑音と残響の影響が大きいため、壁、床、天井精度が低下する。残響とは、音源から直接マイクに届く音声よりも遅れて周囲から反射して複雑に反響した音声が、音源から直接音と混合される現象である。開発した技術の概要と、音声認識精度の評価実験結果について述べる。説明内にムーア・ペンローズの疑事逆行列を表す所が出てくる。 | 音声認識技術は新装学習の導入を契機とし、近年の音声認識性能の向上により、応用分野が急速に拡大している。今後、音声認識技術の応用分野を拡大していくためには、遠隔マイクを用いた音声認識の精度向上が不可欠である。遠隔マイクは音声認識した音声に比べて、口元のマイクで集音した音声に比べて、雑音と残響の影響が大きいため、壁、床、天井精度が低下する。残響とは、音源から直接マイクに届く音声よりも遅れて周囲から反射して複雑に反響した音声が、音源から直接音と混合される現象である。開発した技術の概要と、音声認識制度の評価実験の結果について述べる。Penroseの護事逆行列を表すところが出てくる。 |

深層学習(shinsoo gakushuu: deep learning), 新装学習(shinsoo gakushuu: renewal learning),
集音(shuuon: sound collection), 周恩来(shuuonrai: Zhou Enlai), 音声認識制度(onsee ninshiki seedo:
speech recognition accuracy), 音声認識精度(onsee ninshiki seedo: speech recognition institution),
ペンローズ(penroozu: Penrose), Penrose (Penrose: Penrose), 疑似逆行列(giji gyakugyouretsu: pseudo inverse matrix),
議事逆行列(giji gyakugyouretsu: proceedings inverse matrix), 所(tokoro: place, part), ところ(tokoro: part, place)

FIG. 14

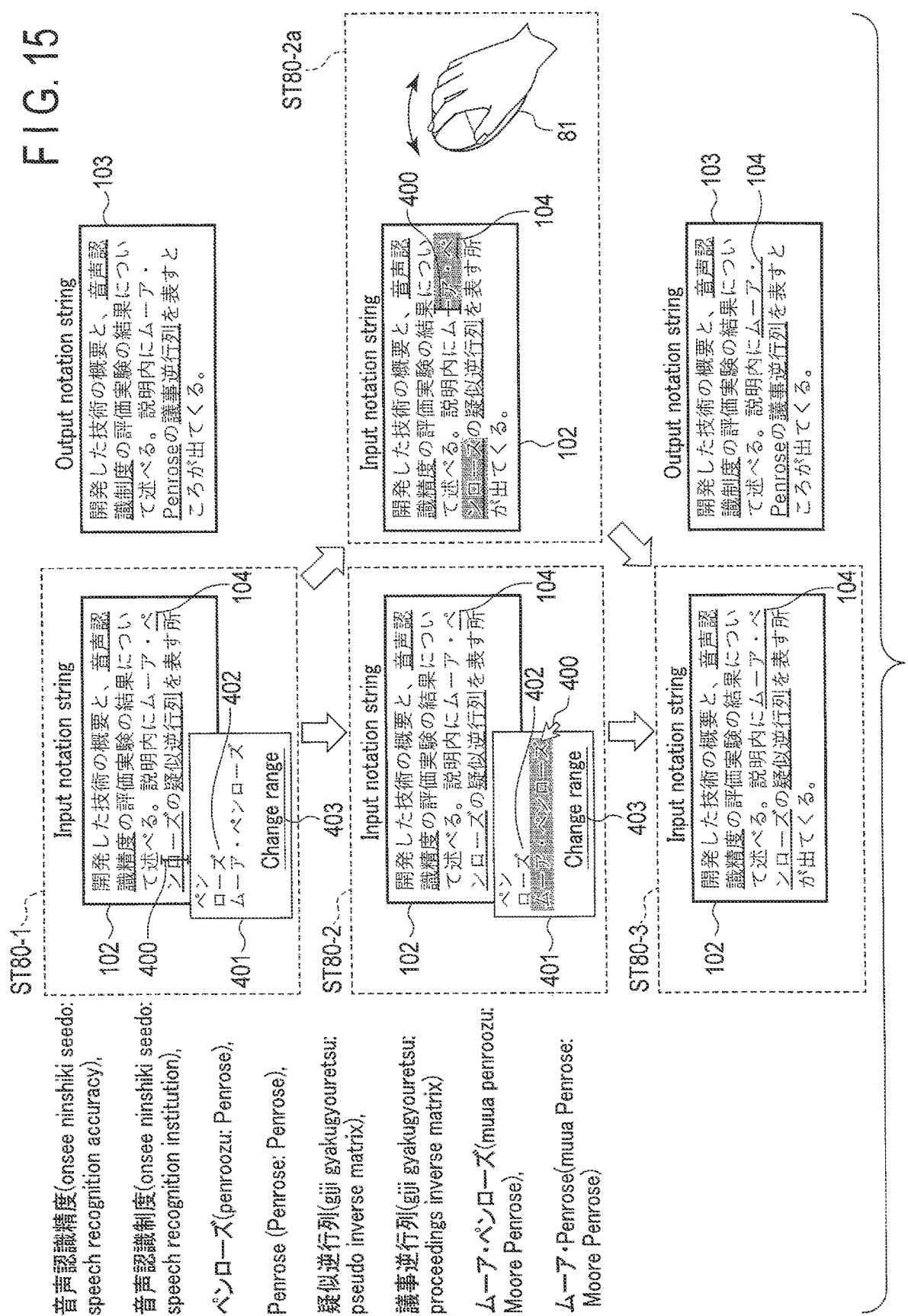

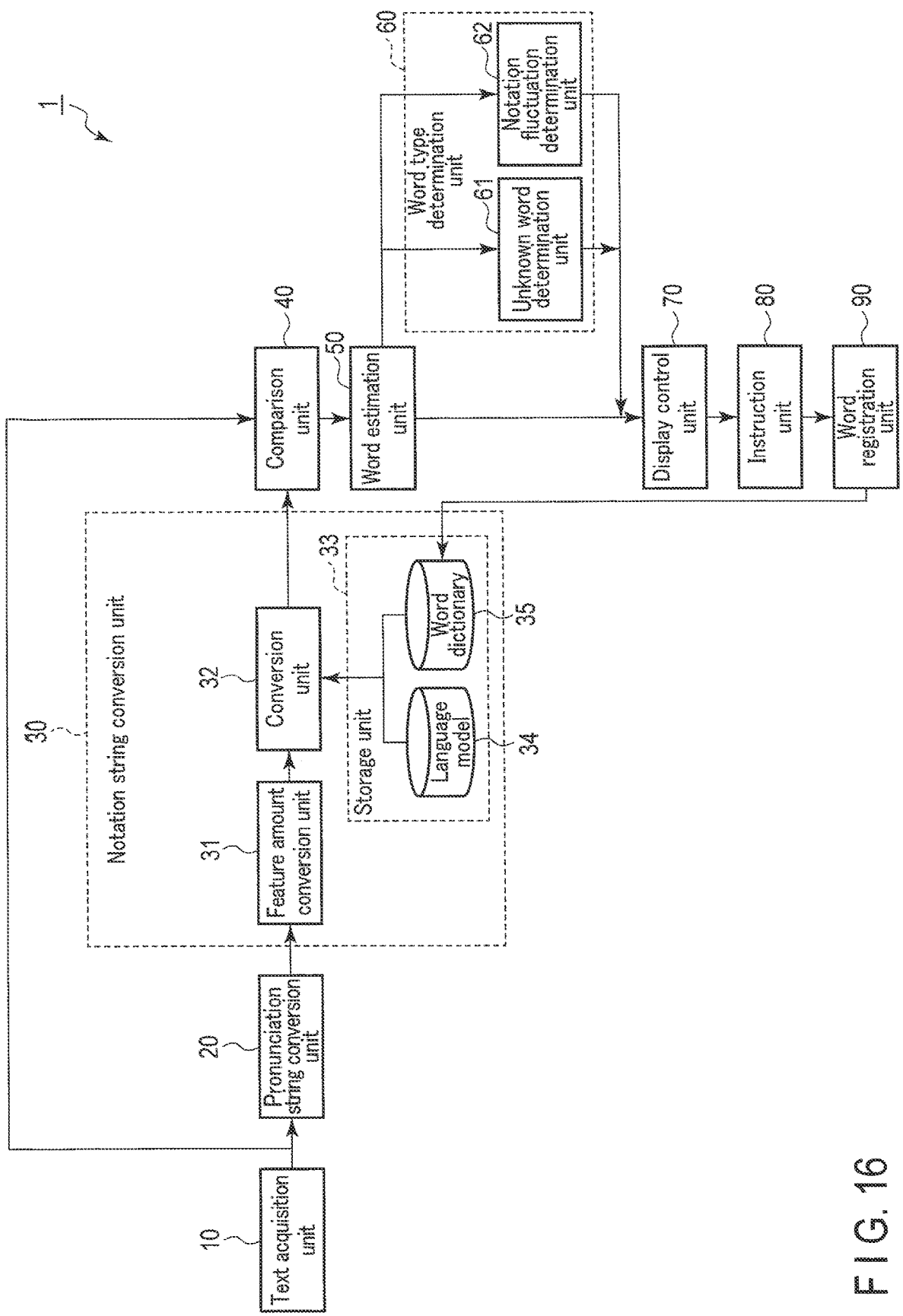
F I G. 16

Word extraction

Input | Output | Text reading

音声認識技術は深層学習の導入を契機とし
た、近年の音声認識性能の向上により、応
用分野が急速に拡大している。今後、更に
音声認識技術の応用分野を拡大していくた
めには、遠隔マイクを用いた音声認識の精
度向上が不可欠である。遠隔マイクは、口元
マイクで集音した音声に比べて、音声認識
雑音と残響の影響が大きいため、音声認識
精度が低下する。残響とは、壁、床、天井
などで複雑に反射した音声が、音源から直
接マイクに届く音声よりも遅れて混合実
れ、直接音と混合される現象である。開発
した技術の評価実験の結果について述べる。ムー
ア・Penroseの疑似逆行列を表すところが
出てくる。

FIG. 21

71 — 深層学習(shinsoo gakushuu: deep learning), 新接学習(shinsoo gakushuu: renewal learning),
101 — 集音(shuuon: sound collection), 周恩来(shuuonrai: Zhou Enlai),
音声認識精度(onsee ninshiki seedo: speech recognition accuracy), 音声認識制度(onsee ninshiki seedo: speech recognition institution),
ペンローズ(penroozu: Penrose), Penrose (Penrose: Penrose),
疑似逆行列(gijj gyakugyouretsu: pseudo inverse matrix), 議事逆行列(gijj gyakugyouretsu: proceedings inverse matrix),
103 — 所(tokoro: place, part), ところ(tokoro: part, place)

802 — シンソウガクシュウ (shinsoo gakushuu: deep learning), 認識精度(ninshiki seedo: recognition accuracy),
オンセエニンシキセエド (onsee ninshiki seedo: speech recognition accuracy),
ギジギャクギョオレツ (gijj gyakugyouretsu: pseudo inverse matrix)

Word registration

| Valid | Notation | Pronunciation | Part of speech |
|---|---|---|---|
| ✓ | 深層学習 | シンソウガクシュウ | Noun |
| ✓ | 認識精度 | ニンシキセエド | Noun |
| ☐ | 音声認識精度 | オンセエニンシキセエド | Noun |
| ✓ | 疑似逆行列 | ギジギャクギョオレツ | Noun |

Registration

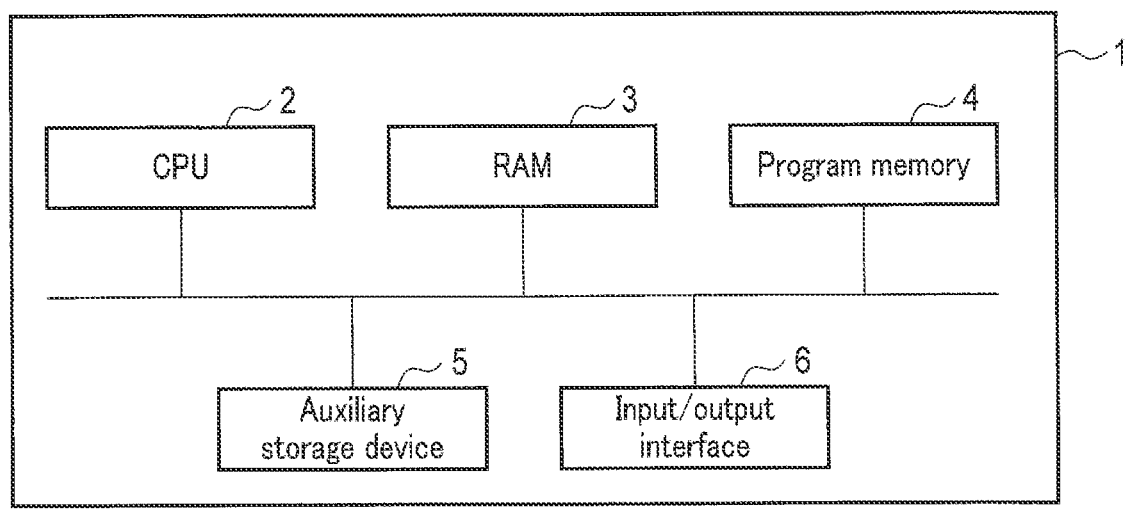
F I G. 22

DIFFERENCE EXTRACTION DEVICE, METHOD AND PROGRAM

CROSS-REFERENCE TO RELATED APPLICATIONS

This application is based upon and claims the benefit of priority from Japanese Patent Application No. 2020-184610, filed Nov. 4, 2020, the entire contents of which are incorporated herein by reference.

FIELD

Embodiments described herein relate generally to a difference extraction device, method and program.

BACKGROUND

In general, a technique for assisting a user's dictionary registration work has been developed, which searches for an unknown word not registered in the dictionary and processes it as a candidate for dictionary registration.

As a technique of this kind, for example, there is known a method in which a compound word is extracted from the result of morphological analysis of a text and is regarded as an unknown word if the compound word is not registered in a constructed dictionary.

BRIEF DESCRIPTION OF THE DRAWINGS

FIG. 1 is a block diagram illustrating the configuration of a difference extraction device according to the first embodiment.

FIG. 7 is a schematic diagram illustrating Japanese syllables used in the first embodiment.

FIG. 11 is a block diagram illustrating the configuration of a difference extraction device according to the second embodiment.

FIG. 14 is a schematic diagram illustrating how an example of a display screen is in the second embodiment.

FIG. 15 is a schematic diagram illustrating how an example of an instruction is made in the second embodiment.

FIG. 16 is a block diagram illustrating the configuration of a difference extraction device according to the third embodiment.

FIG. 21 is a schematic diagram illustrating an example of how a display screen and a registration screen are in the third embodiment.

FIG. 22 is a block diagram illustrating the hardware configuration of a difference extraction device according to the fourth embodiment.

DETAILED DESCRIPTION

Figure 2:
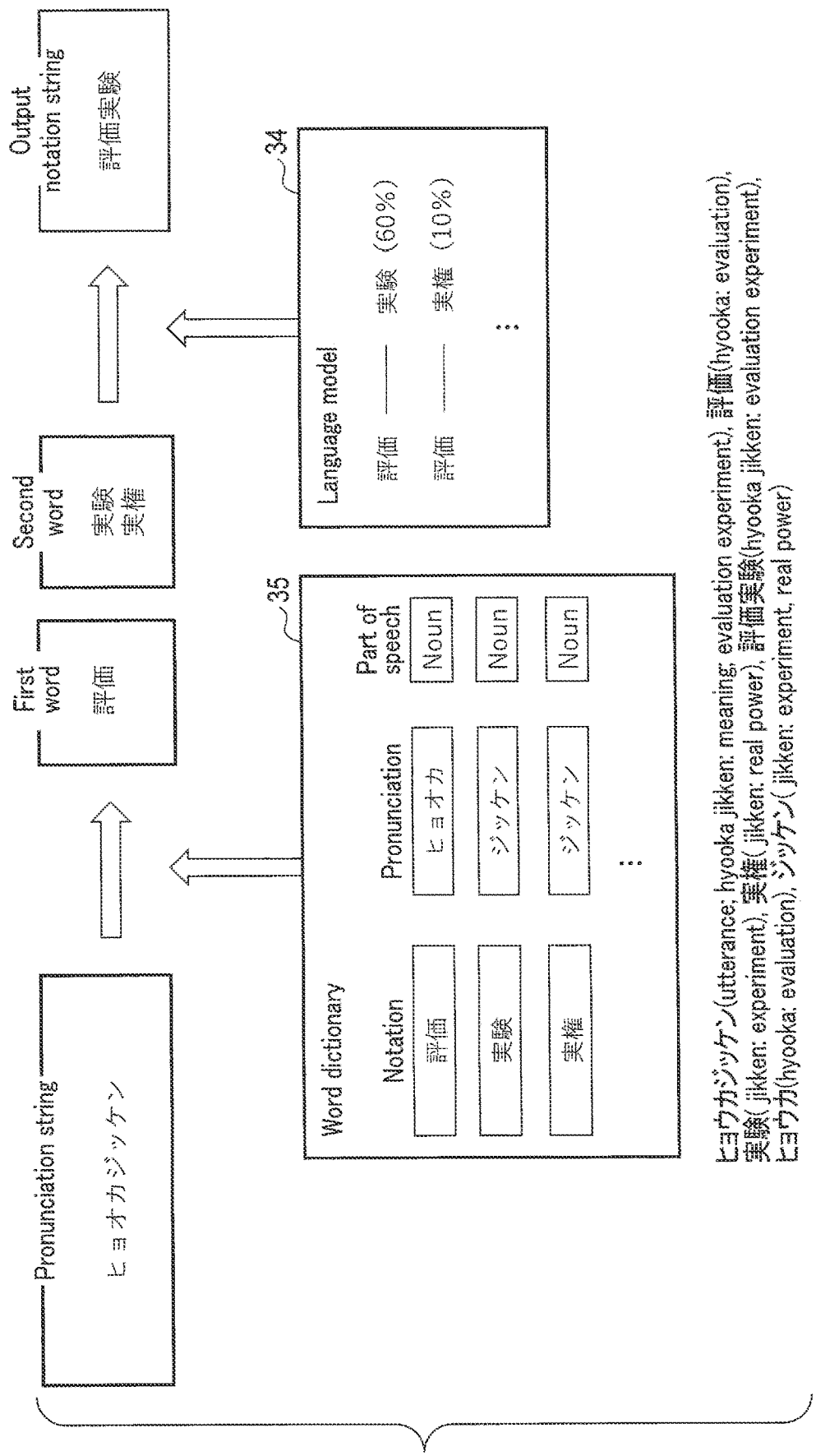
FIG. 2 is a schematic diagram illustrating how a pronunciation string is converted into a notation string in the first embodiment.

In general, according to one embodiment, a difference extraction device includes processing circuitry. The processing circuitry acquires a text in which an input notation string is described. The processing circuitry converts the input notation string into a pronunciation string. The processing circuitry executes a pronunciation string conversion process in which the pronunciation string is converted into an output notation string. The processing circuitry extracts a difference by comparing the input notation string and the output notation string with each other.

Embodiments will be described with reference to the accompanying drawings. In the description below, reference will be made to the case where a difference extraction device is installed in a speech recognition system and is used to extract words to be registered in a word dictionary for speech recognition. The difference extraction device may be referred to using an arbitrary name, such as a word extraction device, a word extraction support device, a dictionary registration device, or a dictionary registration support device, in order to clarify what the device is applied to.

First Embodiment

FIG. 1 is a block diagram illustrating the configuration of a difference extraction device according to the first embodiment. The difference extraction device 1 includes a text acquisition unit 10, a pronunciation string conversion unit 20, a notation string conversion unit 30, a comparison unit 40 and a display control unit 70.

The text acquisition unit 10 acquires a text in which an input notation string is described. The acquired text is sent to the pronunciation string conversion unit 20 and the comparison unit 40. For example, the text acquisition unit 10 may acquire a text including an input notation string from a document file by selecting and opening the document file in a memory (not shown) in accordance with the operator's operation. Further, for example, the text acquisition unit 10 may acquire a key input text which the user inputs by operating a keyboard or a mouse, or a text pasted from another document file. The text acquisition unit 10 may be referred to as a notation string acquisition unit for acquiring an input notation string.

The pronunciation string conversion unit 20 converts an input notation string acquired by the text acquisition unit 10 into a pronunciation string. For example, the pronunciation string conversion unit 20 analyzes the acquired input notation string and converts the input notation string into a pronunciation string, based on the obtained analysis result. The pronunciation string obtained by the conversion is sent to the notation string conversion unit 30. Such a pronunciation string conversion unit 20 may include, for example, a morphological analysis unit 21 and a reading processing unit 22. The pronunciation string is a text that represents how the input notation string is read. For example, where the input notation string is "学習" (utterance: gakushuu, meaning: learning), the pronunciation string is "ガクシュウ" (gakushuu: learning).

The morphological analysis unit 21 analyzes an input notation string acquired by the text acquisition unit 10. For example, the morphological analysis unit 21 divides the input notation string into words and performs morphological analysis to estimate part of speech of each word. The "word" used in the morphological analysis may be read as "morpheme". That is, the morphological analysis includes a process of dividing the input notation string into morphemes and estimating part of speech of each morpheme. The morphological analysis unit 21 may be referred to as an "input notation string analysis unit" or simply as an "analysis unit".

Based on the result of the morphological analysis, the reading processing unit 22 adds a reading to each word and converts each word into a pronunciation string. The reading processing unit 22 may read each word using, for example, a morpheme dictionary (not shown). The morpheme dictionary is used for morphological analysis and is a dictionary in which headwords (words), readings, parts of speech, inflected forms, etc. are described for the respective morphemes. The reading processing unit 22 is not limited to this, and may add a reading to each word by using a word dictionary 35 described below. The word dictionary 35 is a dictionary in which a word notation, a pronunciation string (a reading), and part of speech is stored in association with each other.

The notation string conversion unit 30 converts the pronunciation string obtained by the pronunciation string conversion unit 20 into an output notation string. For example, the notation string conversion unit 30 analyzes a pronunciation string obtained by the pronunciation string conversion unit 20, and converts the pronunciation string into an output notation string, based on the obtained analysis result. The converted output notation string is sent to the comparison unit 40. Such a notation string conversion unit 30 may include, for example, a feature amount conversion unit 31, a conversion unit 32 and a storage unit 33. The storage unit 33 may include a language model 34 and a word dictionary 35.

The feature amount conversion unit 31 converts a pronunciation string into an acoustic score vector. The feature amount conversion unit 31 may execute either of: (1) a process of converting a pronunciation string directly into an acoustic score vector; and (2) a process of first converting the pronunciation string into an audio signal and then converting the audio signal into an acoustic score vector. The first embodiment will be described, referring to the case where the process of (1) is executed. The process of (2) will be mentioned in a modification of the first embodiment.

The acoustic score vector is also referred to as a pronunciation string feature vector, and is a feature vector that permits a pronunciation string to be a correct answer in the conversion unit 32. The feature amount conversion unit 31 may be referred to as an acoustic score conversion unit.

The conversion unit 32 converts an acoustic score vector into an output notation string, using the language model 34 and the word dictionary 35. Specifically, the conversion unit 32 generates a pronunciation string from the acoustic score vector, and converts the generated pronunciation string into an output notation string, using the language model 34 and the word dictionary 35 as illustrated in FIG. 2. The conversion unit 32 may be referred to as an output notation string conversion unit.

The storage unit 33 stores a language model 34 and a word dictionary 35 for speech recognition.

As the language model 34, a model created from the same statistical information as the speech recognition engine for which the speech recognition result is to be confirmed is used. For example, as the language model, an n-gram language model (n is a natural number of 1 or more) that makes a determination by the appearance probability of one word in language model training data can be used. The language model is not limited to the 1-gram language model, and other language models may be used, including a 2-gram language model, a 3-gram language model, a 4-gram language model and a 5-gram language model. In FIG. 2, as the language model 34, a 2-gram language model (n=2) is used which determines the appearance probability of a certain word (second word), depending on a known n−1 word (first word) appearing immediately before the word (second word). In addition, a language model that is modeled using a recurrent neural network (RNN) may be used. Further, a weighted finite state transducer (WFST) speech recognition technique may be used.

In the word dictionary 35, a notation of a word for which speech recognition is to be performed, a pronunciation string corresponding to the notation, and information on the part of speech of the word are registered in association with each other. For example, where the word is "評価" (hyooka: evaluation), the notation is "評価" (hyooka: evaluation). In the case of the word "評価" (hyooka: evaluation), the pronunciation string corresponding to the notation is "ヒョオカ" (hyooka: evaluation).

Figure 3:
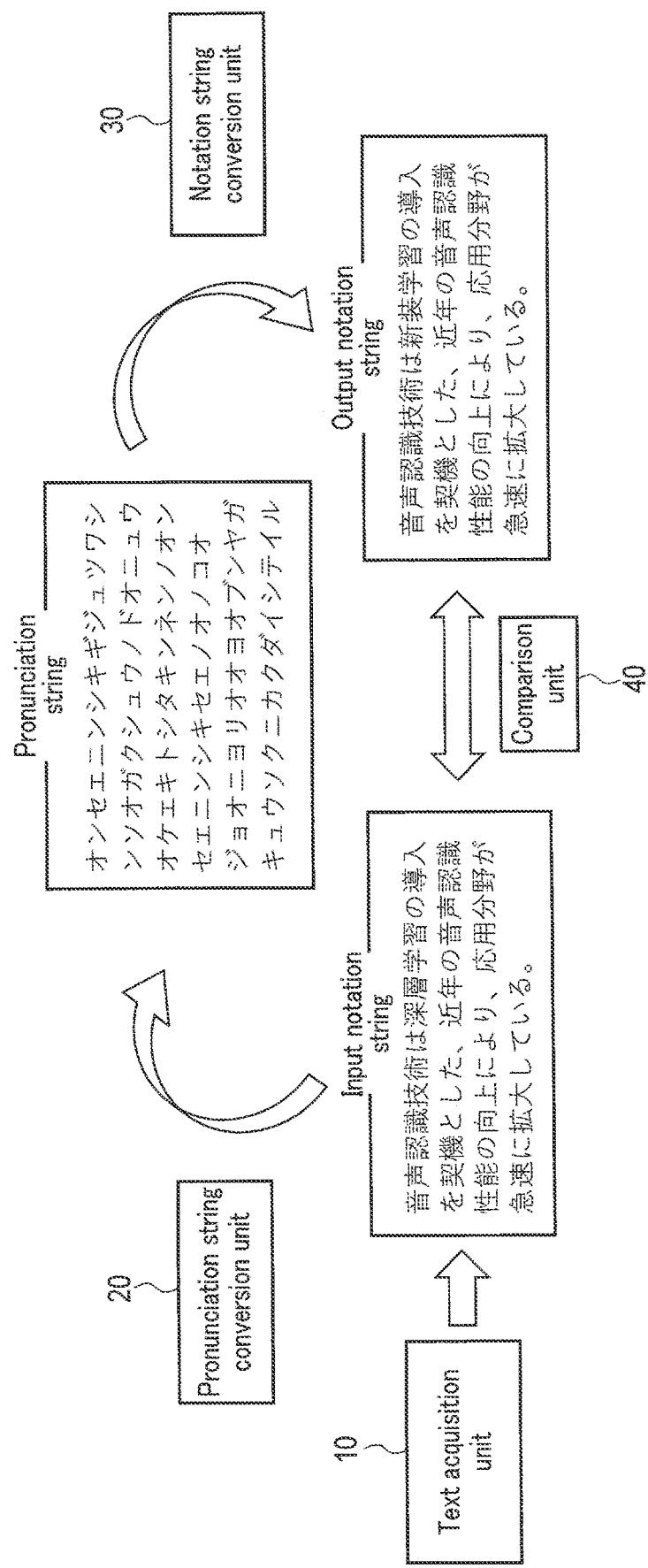
FIG. 3 is a schematic diagram for illustrating a comparison unit according to the first embodiment.

As illustrated in FIG. 3, the comparison unit 40 compares an input notation string acquired by the text acquisition unit 10 with an output notation string obtained from the input notation string by means of both the pronunciation string conversion unit 20 and the notation string conversion unit 30, and extracts a difference based on the comparison. The term "extracts a difference" may be paraphrased as "detects a difference" or "identifying a difference". The comparison unit 40 sends a difference extraction result to the display control unit 70. The difference extraction result includes, for example, an input notation string in which the difference is identifiable and an output notation string in which the difference is identifiable. The difference extraction result is not limited to this, and may include an input notation string, an output notation string, and difference identification information for specifying the difference in both the input notation string and the output notation string (e.g., notation "○○" of the difference and the position thereof (the xx-th character from the beginning of the text)).

Figure 4:
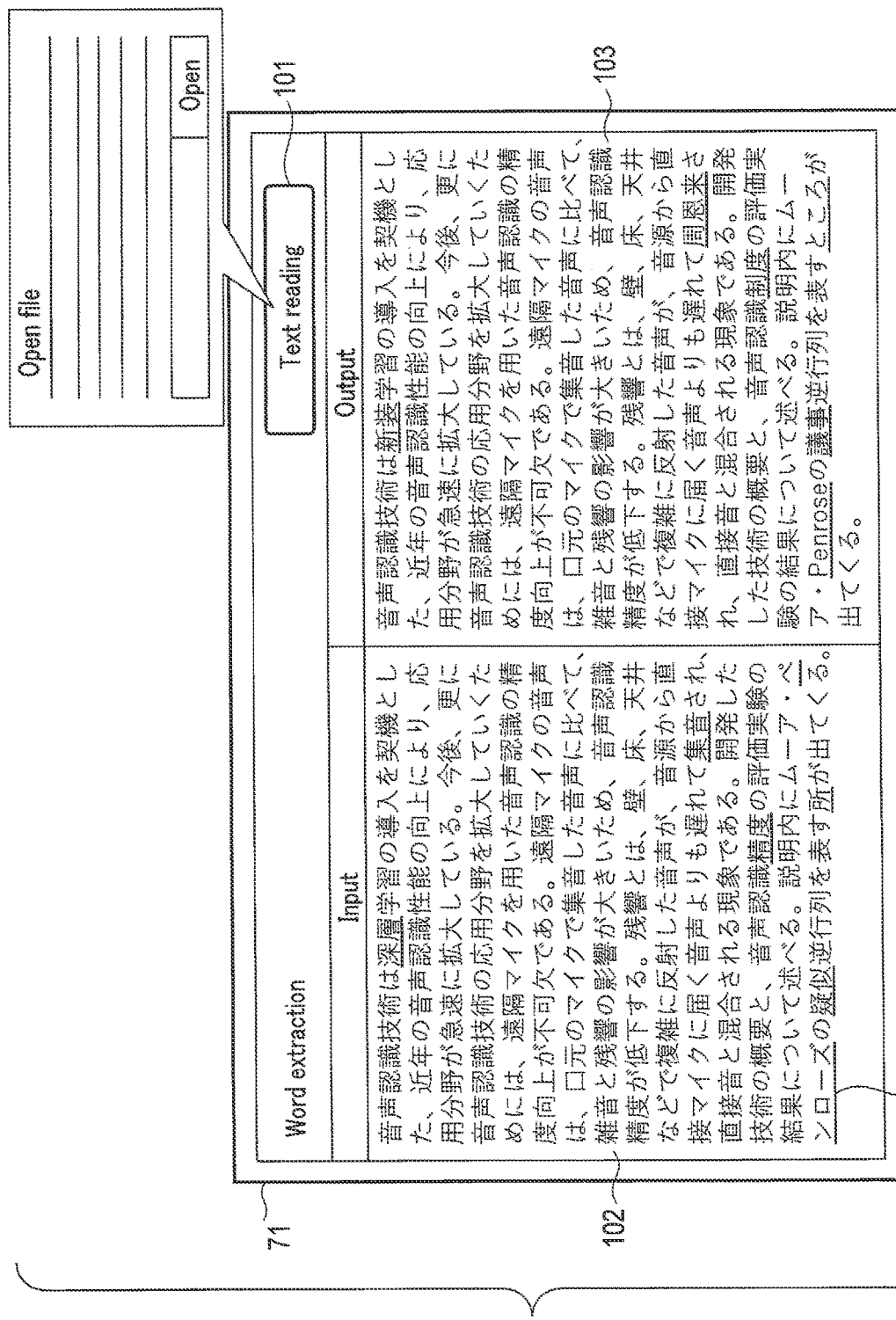
FIG. 4 is a schematic diagram illustrating a display screen according to the first embodiment.

The display control unit 70 causes the input notation string, the output notation string, the comparison result, etc. sent from the comparison unit 40 to be displayed on a display. More specifically, as illustrated in FIG. 4, the display control unit 70 causes a text reading button 101, an input notation string display screen 102 and an output notation string display screen 103 to be displayed on the display 71. The text reading button 101 is a button for causing the text acquisition unit 10 to acquire a text. The input notation string display screen 102 is a screen on which an input notation string including a difference is arranged. The output notation string display screen 103 is a screen on which an output notation string including the difference is arranged. The input notation string display screen 102 and the output notation string display screen 103 may be referred to as an input notation string display area and an output notation string display area, respectively. The difference is displayed such that it can be distinguished from the notation strings other than that of the difference by the display attribute 104. In FIG. 4, the display attribute 104 is a solid underline. However, the display attribute 104 is not limited to this, and an attribute capable of identifying the presence or absence of a difference can be appropriately used. For example, various display attributes such as character color, font type and size and background color may be used as the display attribute.

Figure 5:
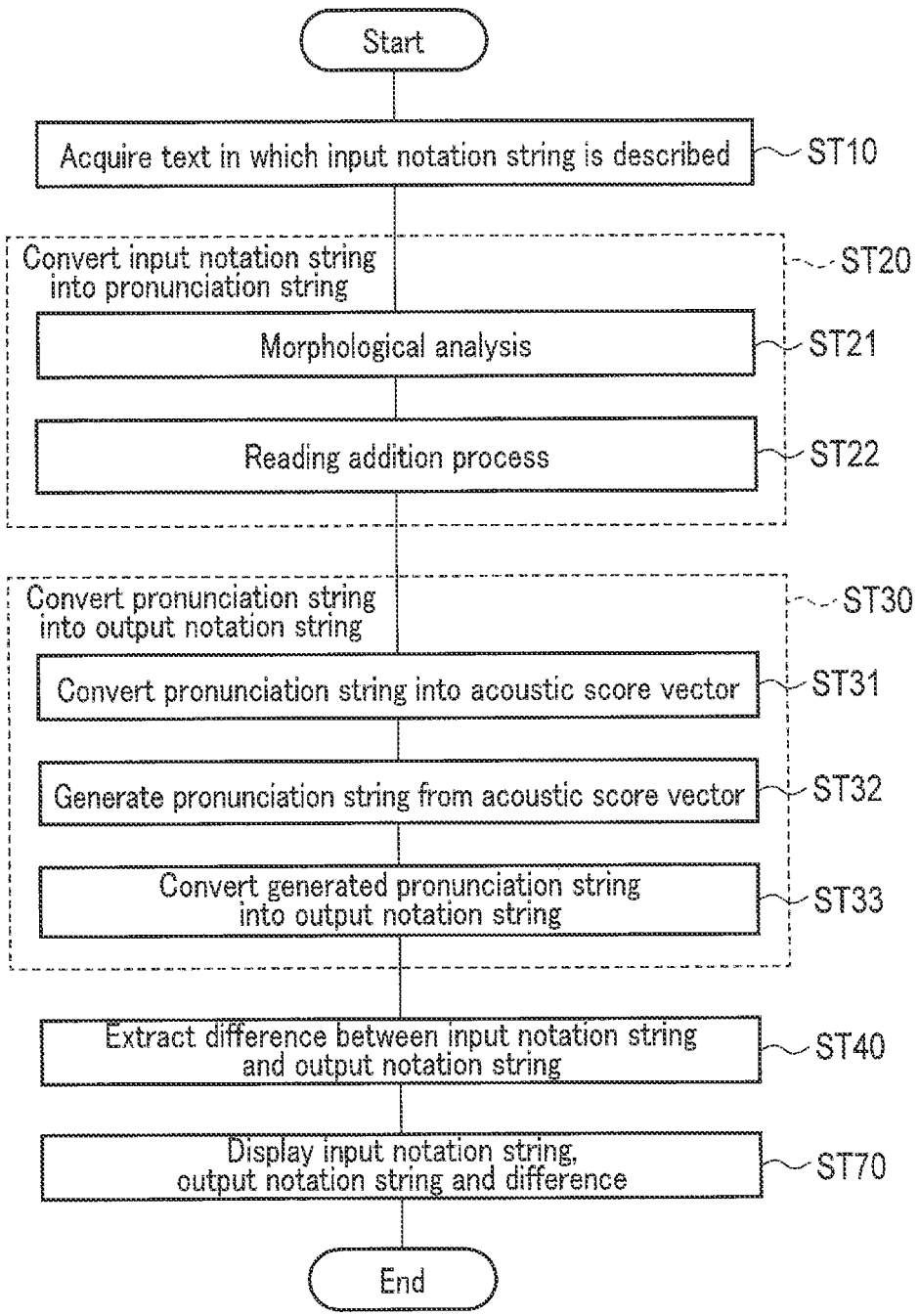
FIG. 5 is a flowchart for illustrating how an operation is performed in the first embodiment.
Figure 6:
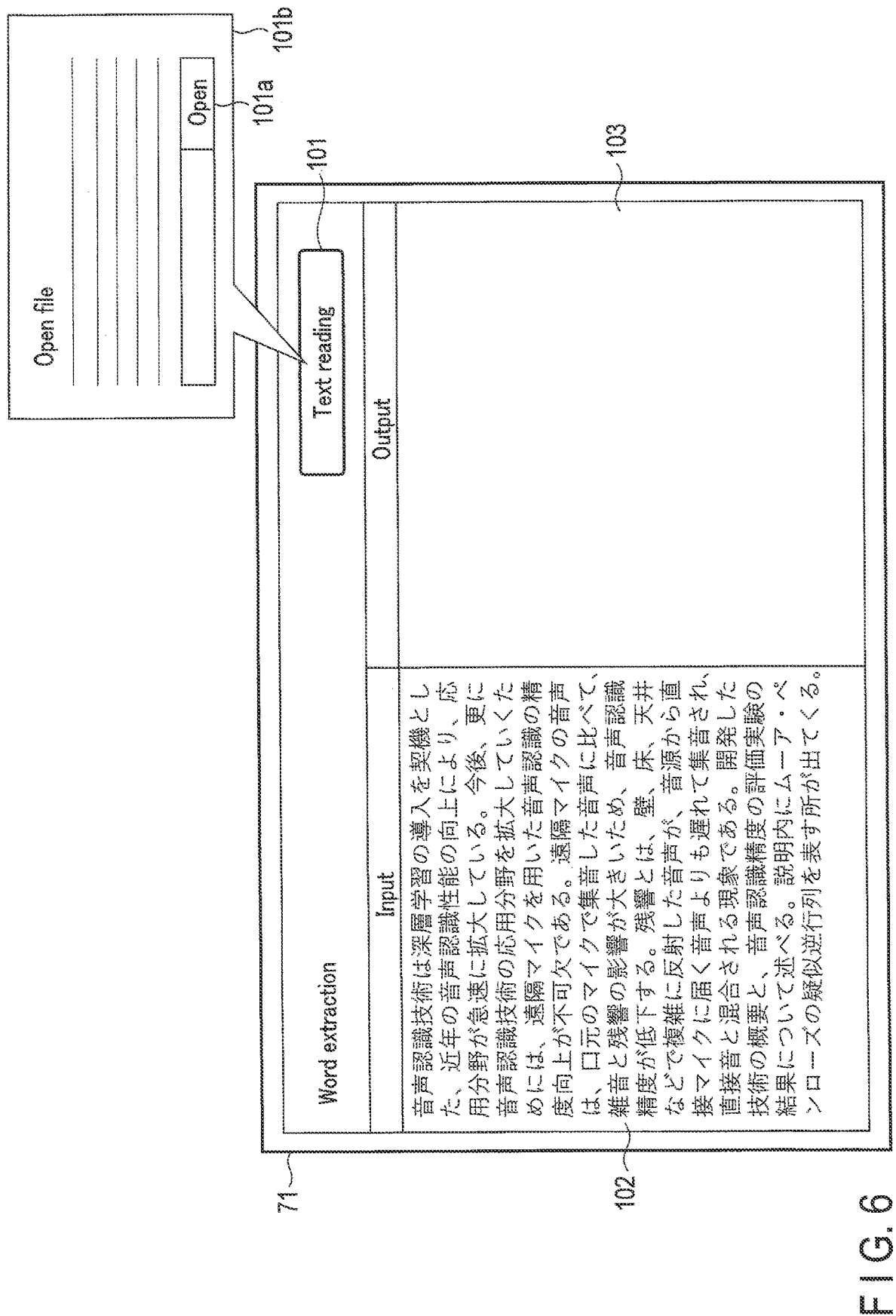
FIG. 6 is a schematic diagram for illustrating how an operation is performed in the first embodiment.

Next, how the difference extraction device configured as described above operates will be described with reference to the above-described drawings, the flowchart of FIG. 5 and the schematic views of FIGS. 6 to 8. The operation of the difference extraction device corresponds to a difference extraction method.

In step ST10, the text acquisition unit 10 acquires a text in which the input notation string is described. Specifically, for example, as illustrated in FIG. 6, the display control unit 70 causes the text reading button 101, the input notation string display screen 102 and the output notation string display screen 103 to be displayed on the display 71. Before the text is acquired, the input notation string display screen 102 is blank unlike that illustrated in FIG. 6. The text reading button 101 is a button for causing the text acquisition unit 10 to execute a process in which a list of selectable files and a file selection screen 101*b* including an open button 101*a* are displayed on the display 71 in response to a user's operation. The open button 101*a* is a button for causing the text acquisition unit 10 to open a file selected in the list and to acquire the text in the opened file in response to a user's operation.

The text acquisition unit 10 causes the file selection screen 101*b* to be displayed on the display 71 in response to an operation of the text reading button 101. The text acquisition unit 10 selects a file in the list in response to a user's operation, and acquires the text describing the input notation string from the selected file in response to an operation of the open button 101*a*. The acquired text is displayed on the input notation string display screen 102 and sent to the pronunciation string conversion unit 20.

In step ST20, the pronunciation string conversion unit 20 analyzes the input notation string acquired in step ST10 and converts it into a pronunciation string. Specifically, the pronunciation string conversion unit 20 analyzes the input notation string and converts it into a pronunciation string, based on the obtained analysis result. Step ST20 mentioned above is executed as steps ST21 to ST22 by the morphological analysis unit 21 and the reading processing unit 22.

In step ST21, the morphological analysis unit 21 performs morphological analysis on the acquired input notation string, divides it into morphemes, and estimates part of speech. Specifically, the morphological analysis unit 21 divides the input notation string into words and performs morphological analysis to estimate part of speech of each word. For example, where the acquired notation string is "評価実験" (hyooka jikken: evaluation experiment), it is divided into "評価" (hyooka: evaluation) and "実験" (jikken: experiment), each of which is presumed to be a noun.

In step ST22, the reading processing unit 22 receives the result from the morphological analysis unit 21, determines a reading of each morpheme, and supplies a pronunciation string to the notation string conversion unit 30. Specifically, based on the result of the morphological analysis, the reading processing unit 22 adds a reading to each word and converts each word into a pronunciation string. For example, where "評価" (hyooka: evaluation) and "実験" (jikken: experiment) are output from the morphological analysis unit 21, the reading processing unit 22 adds readings "ヒョオカ" (hyooka: evaluation) and "ジッケン" (jikken: experiment) to the output results, respectively. Then, the "ヒョオカジッケン" (hyooka jikken: evaluation experiment) is transferred to the notation string conversion unit 30. Thus, step ST20 including steps ST21 to ST22 ends.

In step ST30, the notation string conversion unit 30 receives a pronunciation string converted in step ST20 as an input, analyzes the pronunciation string, converts it into an output notation string, and sends the output notation string to the comparison unit 40. Step ST30 mentioned above is executed as steps ST31 to ST33 by the feature amount conversion unit 31 and the conversion unit 32.

In step ST31, the feature amount conversion unit 31 converts the pronunciation string obtained in step ST20 into an acoustic score vector. Specifically, the feature amount conversion unit 31 generates a pronunciation string feature amount vector from the acquired pronunciation string. The pronunciation string feature vector is a feature vector that permits a pronunciation string to be a correct answer in the conversion unit 32 of the subsequent stage. For example, in a DNN-HMM speech recognition engine using DNN and HMM, a speech section is cut out as one frame at regular time intervals. With respect to the cut out frame, a pronunciation state output probability vector (pronunciation state acoustic score vector) of the pronunciation series is calculated using DNN. DNN is an abbreviation for Deep Neural Network. HMM is an abbreviation for Hidden Markov Model.

A description will be given of the pronunciation state acoustic score vector. The unit of pronunciation is referred to as a syllable. In the case of the Japanese language, the syllables include voiced sound ("ガ" (ga), "ザ" (za), etc.), semi-voiced sound ("パ" (pa), etc.), contracted sound ("キャ" (kya)) "ジャ" (ja), etc.), in addition to the so-called Japanese syllabary. Each of the nasal "ン" (n, m) and double consonant "ッ" (tt, kk, pp) is also treated as one syllable, and the long vowel "-" is replaced with the immediately preceding vowel. In the present specification, the Japanese syllables will be described as including the 102 syllables illustrated in FIG. 7. Usually, each pronunciation is expressed by HMM of about 3 states, but for the simplification of description, each pronunciation will be described as being in one state. The pronunciation state acoustic score vector in this case is a 102-dimensional vector in which the value of each element of the vector represents the likelihood of a corresponding syllable. That is, as the pronunciation state acoustic score vector, one 102-dimensional vector is output from the feature amount conversion unit 31 for each syllable with respect to the pronunciation string input to the feature amount conversion unit 31. However, this is not restrictive, and each pronunciation may be expressed in three states, and a 306-dimensional pronunciation state acoustic score vector may be used for each syllable.

As a method of conversion of the pronunciation state acoustic score vector, the element (output probability) corresponding to a syllable to be converted may be set to 1, and the other elements may be set to 0. For example, where "

Figure 8:
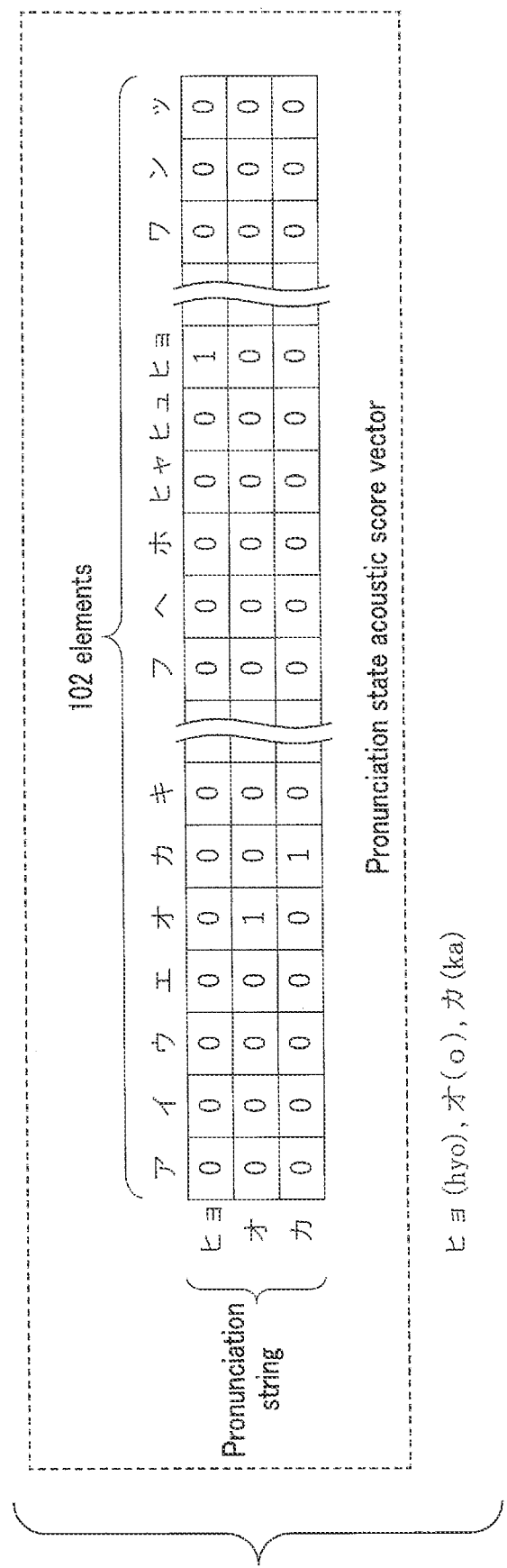
FIG. 8 is a schematic diagram illustrating a pronunciation state acoustic score vector used in the first embodiment.

"ヒョオカ" (hyooka: evaluation) is input as a ヒョオカ pronunciation string, a vector may be generated such that only the element corresponding to "ヒョ" (hyo) is 1 for the input "ヒョ" and the other elements are 0, as illustrated in FIG. 8. Likewise, for "オ" (o), it is sufficient to output a vector in which only the element corresponding to "オ" (o) is 1 and the other elements are 0. This holds true of "カ" (ka) as well. The pronunciation state acoustic score vector string has the highest likelihood with respect to the pronunciation string consisting of "ヒョ" (hyo), "オ" (o), and "カ" (ka). Therefore, where this pronunciation state acoustic score vector string is supplied to the conversion unit 32 (e.g., a DNN-HMM decoder), the conversion unit 32 converts the acoustic score vector into a pronunciation string and converts the pronunciation string into a notation string. Specifically, where the word dictionary 35 includes the same pronunciation string as the input pronunciation string, the conversion unit 32 outputs the same pronunciation string as the input pronunciation string, and outputs a notation string determined depending on the language model 34.

The method of creating a pronunciation state acoustic score vector is not limited to this, and an output using an arbitrary ratio may be used, such as an output in which the element of a corresponding state, not the output probability, is 10.0 and the other elements are 5.0. Further, noise may be added to the pronunciation state acoustic score vector to determine whether or not a desired result is output under severer conditions. Still further, in HMM speech recognition using a Gaussian Mixture Model (GMM), a vector in which an average value of a plurality of dimensions of GMM representing pronunciation string states is an element may be used as the pronunciation state acoustic score vector. In this case, however, a language model and an acoustic model for the GMM-HMM speech recognition engine are used when the notation string conversion is executed.

In step ST32, the conversion unit 32 converts the pronunciation state acoustic score vector string obtained in step ST31 into a pronunciation string. More specifically, a description will be given, referring to the case where the value of each element of the pronunciation state acoustic score vector is a 102-dimensional vector representing the likelihood of the corresponding syllable. The unit of pronunciation will be mentioned as a syllable.

The conversion unit 32 estimates the corresponding syllable, based on the pronunciation state acoustic score vector. The Japanese syllables are expressed as voiced sound ("ガ" (ga), "ザ" (za), etc.), semi-voiced sound ("パ" (pa), etc.), contracted sound ("キャ" (kya)), "ジャ" (ja), etc.), in addition to the so-called Japanese syllabary. Each of the nasal "ン" (n, m) and the double consonant "ッ" (tt, kk, pp) is also treated as one syllable, and the long vowel "-" is replaced with the immediately preceding vowel. In the present specification, the Japanese syllables will be described as including 102 syllables illustrated in FIG. 7. In the present specification, syllables are expressed in katakana, but this is not restrictive. Syllables may be expressed in hiragana. Since the value of each element indicates the likelihood of a syllable in the pronunciation state acoustic score vector, it is assumed that a syllable having a large likelihood value is the corresponding syllable. For example, where in a 102-dimensional pronunciation state acoustic score vector, only the value of the element corresponding to the syllable "ヒョ" (hyo) is 1 and the values of the other elements are 0, this pronunciation state acoustic score vector is converted to the syllable "ヒョ" (hyo). Although the values of the elements of the pronunciation state acoustic score vector have been described only as 0 and 1, this is not restrictive. As the pronunciation state acoustic score vector, any vector whose element value represents the likelihood can be used. That is, in this kind of pronunciation state acoustic vector, a syllable with a high likelihood is estimated and converted into a syllable in a similar way. In the manner described above, the conversion unit 32 converts a pronunciation state acoustic score vector into syllables and generates a pronunciation string.

In step ST33, the conversion unit 32 converts the pronunciation string obtained in step ST32 into an output notation string while referring to the language model 34 and the word dictionary 35 stored in the storage unit 33.

That is, the conversion unit 32 refers to the word dictionary 35 and estimates notation candidates corresponding to the pronunciation strings, that is, word candidates. Further, the conversion unit 32 uses the language model 34 to select a word suitable as a sentence from the word candidates estimated by the word dictionary 35, in consideration of the context of the word, and generates a notation string.

A detailed description will be given of an example of an operation of step ST33 with reference to FIG. 2 mentioned above. It is assumed that in the word dictionary 35, at least the notation "評価" (hyooka: evaluation) is registered for the pronunciation string "ヒョオカ" (hyooka), and the notation "実験" (jikken: experiment) and the notation "実権" (jikken: real power) are registered for the pronunciation string "ジッケン" (jikken). Using a 2-gram language model expressed by the appearance probability of two words, reference will be made to a case where, in the training data of the language model, the combination ""評価実験"" (hyooka jikken: evaluation experiment) appears more frequently than the combination "評価実権" (hyooka jikken: evaluation real power) with respect to the pronunciation string "ヒョオカジッケン" (hyooka jikken).

The conversion unit 32 first refers to the word dictionary 35 for the pronunciation string "ヒョオカジッケン" (hyooka jikken). As a result, one candidate "評価" (hyooka: evaluation) is obtained for the pronunciation string "ヒョオカ" (hyooka), and two candidates "実験" (jikken: experiment) and "実権" (jikken: real power) are obtained for the pronunciation string "ジッケン" (jikken).

Next, the conversion unit 32 determines an appropriate combination of "ヒョオカ" (hyooka) and "ジッケン" (jikken), using the language model 34. In the case of the language model illustrated in FIG. 2, the appearance probability of the "評価実験" (hyooka jikken: evaluation experiment) is higher than that of the "評価実権" (hyooka jikken: evaluation real power), so that the notation string "評価実験" (hyooka jikken: evaluation experiment) is determined with respect to the pronunciation string "ヒョオカジッケン" (hyooka jikken). In the case of this example, the determined notation string "評価実験" (hyooka jikken: evaluation experiment) is the same as the input notation string "評価実験" (hyooka jikken: evaluation experiment) as illustrated in FIG. 4, and the notation is correct and does not have to be registered in the word dictionary 35. It should be noted that as illustrated in FIG. 3, there may be a case where the determined notation string "新装学習" (shinsoo gakushuu: renewal learning) is different from the input notation string "深層学習" (shinsoo gakushuu: deep learning). In this case, the difference "深層" (shinsoo: deep) is extracted by the comparison unit 40 of the subsequent stage.

For the conversion from the pronunciation string to the notation string, a Viterbi algorithm using an appearance probability of n-gram (n is a natural number of 1 or more)

is used for the input pronunciation string. The search algorithm is not limited to the Viterbi algorithm, and other algorithms such as the tree trellis search algorithm may be used. The conversion unit 32 supplies the output notation string obtained by the conversion to the comparison unit 40. Thus, step ST30 including steps ST31 to ST33 ends.

In step ST40, the comparison unit 40 compares the input notation string acquired in step ST10 with the output notation string supplied in step ST30 and extracts a difference. For example, as illustrated in FIG. 3, the input notation string acquired by the text acquisition unit 10 is converted into a pronunciation string by the pronunciation string conversion unit 20, and is further converted into an output notation string by the notation string conversion unit 30. Then, when comparison is performed by the comparison unit 40, the "深慮" (shinsoo: deep) is extracted as a difference.

In step ST70, the display control unit 70 causes the display 71 to display both the input notation string display screen 102 including the input notation string and the output notation string display screen 103 including the output notation string, as illustrated, for example, in FIG. 4. Further, the display control unit 70 displays the difference on both the input notation string display screen 102 and the output notation string display screen 103 of the display 71 such that the difference can be distinguished from other notations by the display attribute 104. In this state, the notation including the difference can be registered in the word dictionary 35 as appropriate in response to the user's operation of the keyboard, mouse or the like. Registration to the word dictionary 35 can be made after such processing as the word estimation described later.

As described above, according to the first embodiment, the text acquisition unit acquires a text in which an input notation string is described. The pronunciation string conversion unit converts the input notation string into a pronunciation string. The notation string conversion unit converts the pronunciation string into an output notation string. The comparison unit compares the input notation string and the output notation string and extracts a difference therebetween.

With the above configuration, unknown words which are among the unknown words included in the input notation string and which do not have correct notations in the output notation string are extracted as differences. In other words, unknown words which are among the unknown words included in the input notation string and which have correct notations in the output notation string are not extracted as differences. Therefore, unknown words which are among the unknown words and which have correct notations without registration are prevented from being registered. Moreover, even where the input notation string is small in amount, how such input notation string is different from the output notation string can be extracted. In addition, the input notation string and the output notation string converted from the input notation string via the pronunciation string are compared and the part that does not have the correct notation is extracted as a difference, so that a difference useful for speech recognition can be extracted. Further, since the user performs the dictionary registration work for an extracted difference, unnecessary words, such as those caused by notational fluctuations are prevented from being registered. In addition, when a word dictionary is created, words to be registered in the word dictionary can be presented to the user in an easy-to-understand manner. Since the user performs dictionary registration work, the word dictionary can be improved for each user in accordance with the field of the notation string.

According to the first embodiment, the notation string conversion unit may include a feature amount conversion unit, a storage unit and a conversion unit. The feature amount conversion unit may convert the pronunciation string into an acoustic score vector. The storage unit may store a language model and a word dictionary for speech recognition. The conversion unit may generate a pronunciation string from the acoustic score vector and convert the generated pronunciation string into an output notation string, using the language model and the word dictionary. In this case, since the output notation string is obtained by using the language model and word dictionary for speech recognition, a more appropriate difference can be extracted as a notation including unknown words that are not in the word dictionary.

Moreover, according to the first embodiment, the pronunciation string conversion unit may include a morphological analysis unit and a reading processing unit. The morphological analysis unit may divide the input notation string into words and perform morphological analysis to estimate part of speech of each word. Based on the result of the morphological analysis, the reading processing unit may add a reading to each word and convert it into a pronunciation string. In this case, in addition to the above-mentioned advantages, conversion to a pronunciation string can be easily performed as compared with the case where information other than readings, such as accents and pauses, are used for the conversion to the pronunciation string.

<Modification of First Embodiment>

In a modification of the first embodiment, the feature amount conversion unit 31 performs a process of first converting a pronunciation string into an audio signal and then converting the audio signal into an acoustic score vector, instead of the process of converting the pronunciation string directly into the acoustic score vector.

Figure 9:
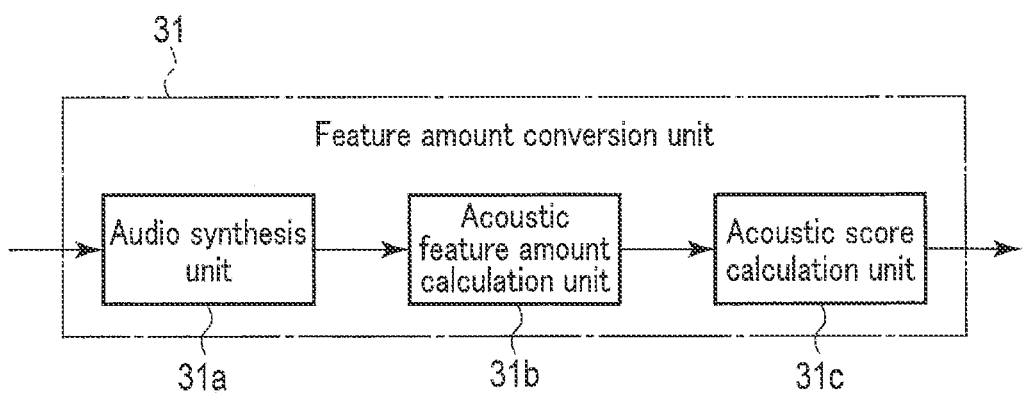
FIG. 9 is a block diagram illustrating a feature amount conversion unit according to a modification of the first embodiment.

As illustrated in FIG. 9, the feature amount conversion unit 31 includes an audio synthesis unit 31a, an acoustic feature amount calculation unit 31b and an acoustic score calculation unit 31c.

The audio synthesis unit 31a synthesizes an audio signal from a pronunciation string converted by the pronunciation string conversion unit 20. The synthesized audio signal is sent to the acoustic feature amount calculation unit 31b. The "audio signal" is also referred to as an "audio waveform signal". For example, the audio synthesis unit 31a generates an audio waveform signal according to an input pronunciation string.

The acoustic feature amount calculation unit 31b calculates an acoustic feature vector from an audio signal synthesized by the audio synthesis unit 31a. For example, the acoustic feature amount calculation unit 31b calculates an acoustic feature vector from the audio signal, the acoustic feature vector representing a spectral feature in units of a predetermined frame. The calculated acoustic feature vector is sent to the acoustic score calculation unit 31c.

The acoustic score calculation unit 31c calculates an acoustic score vector from the acoustic feature vector calculated by the acoustic feature amount calculation unit 31b. For example, the acoustic score calculation unit 31c estimates the likelihood of each syllable from the acoustic feature vector and calculates a pronunciation state acoustic score vector. The calculated acoustic score vector is sent to the conversion unit 32 described above.

The other configurations are similar to those of the first embodiment.

Figure 10:
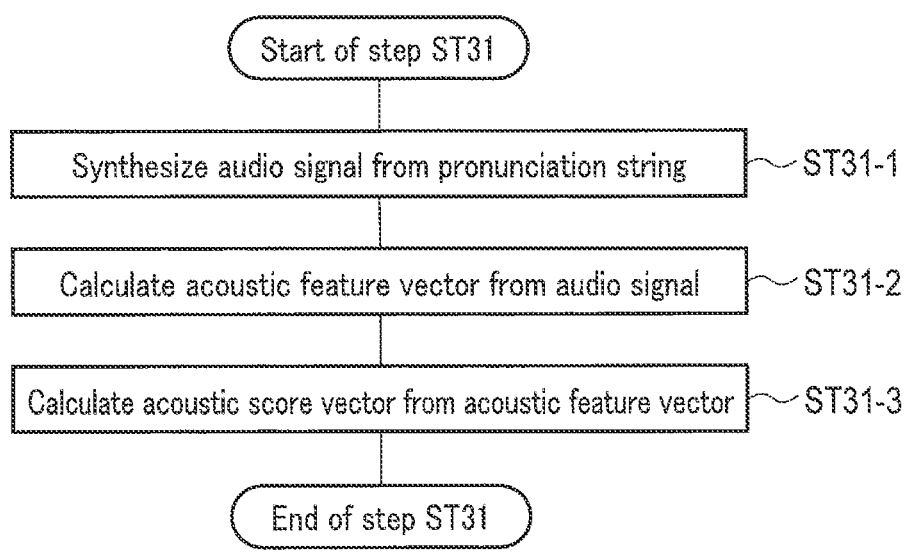
FIG. 10 is a flowchart for illustrating how an operation is performed in the modification of the first embodiment.

Next, an operation of the modification having the above configurations will be described with reference to the flowchart of FIG. 10. In the description given below, the operation of step ST31 for converting a pronunciation string into an acoustic score vector will be mentioned. That is, the processes of steps ST10 to ST20 are executed in the same manner as described above, and the process of step ST31 is started in step ST30. Step ST31 includes steps ST31-1 to ST31-3.

In step ST31-1, the audio synthesis unit 31a synthesizes an audio signal from a pronunciation string converted by the pronunciation string conversion unit 20. The audio synthesis unit 31a can use various known methods capable of generating an audio waveform signal from an arbitrary pronunciation string. For example, it is possible to use a method in which waveform data on respective syllables are stored and waveform data are selected and connected in accordance with an input pronunciation string. The waveform data may be connected as they are without changing the pitch information representing the intonation of speech, or the pitch of the waveform data may be corrected by estimating a natural pitch change using a known technique. Further, a spectral parameter sequence for each syllable may be stored instead of the waveform data, and an audio signal may be synthesized using a sound source filter model. Alternatively, a DNN that predicts a spectral parameter sequence from a syllable sequence may be used. In any case, the audio synthesis unit 31a synthesizes an audio signal from the pronunciation string and sends the audio signal to the acoustic feature amount calculation unit 31b.

In step ST31-2, the acoustic feature amount calculation unit 31b calculates an acoustic feature vector from the audio signal synthesized in step ST31-1. For example, the acoustic feature amount calculation unit 31b calculates acoustic feature vector series from the audio waveform signal in a process similar to that used in the speech recognition processing. First, the acoustic feature amount calculation unit 31b performs a short-time Fourier transform on input audio data, for example, with a frame length of 10 ms and a frame shift of 5 ms, thereby converting the input audio data into a spectrum. Next, the acoustic feature amount calculation unit 31b obtains the total power spectrum for each band, based on the specifications of a predetermined bandwidth, converts it into a filter bank feature vector, and sends this feature bank to the acoustic score calculation unit 31c as an acoustic feature vector. Various acoustic feature vectors such as mel frequency cepstral coefficients (MFCC) can be used as the acoustic feature vector.

In step ST31-3, the acoustic score calculation unit 31c calculates an acoustic score vector from the acoustic feature vector calculated in step ST31-2. For example, the acoustic score calculation unit 31c receives the acoustic feature vector as an input, estimates a pronunciation state acoustic score vector using DNN, and outputs it. Various known methods used in speech recognition can also be used for the processing performed by the acoustic score calculation unit 31c. Instead of fully-connected DNN, a convolutional neural network (CNN), a long short-term memory (LSTM) or the like may be used. In any case, the acoustic score calculation unit 31c calculates an acoustic score vector from an acoustic feature vector and sends the acoustic score vector to the conversion unit 32. In this manner, step ST31 including steps ST31-1 to ST31-3 ends.

Thereafter, the processes after step ST32 are executed in the same manner as described above.

As described above, according to the modification of the first embodiment, the feature amount conversion unit includes an audio synthesis unit, an acoustic feature amount calculation unit and an acoustic score calculation unit. The audio synthesis unit synthesizes an audio signal from a pronunciation string. The acoustic feature amount calculation unit calculates an acoustic feature vector from an audio signal. The acoustic score calculation unit calculates an acoustic score vector from the acoustic feature vector.

In the configuration in which a pronunciation string is first converted into an audio signal and then the audio signal is converted into an acoustic score vector, a more suitable acoustic score vector can be supplied to the conversion unit that uses a language model and a word dictionary for speech recognition. This is an advantage obtained in addition to the advantages of the first embodiment.

To supplement the description, according to the modification, an output pronunciation state acoustic score vector is similar to a vector generated in the actual speech recognition processing, so that a notation string closer to a speech recognition result can be generated. The pronunciation state acoustic score vector of the modification tends to have a large value not only for the element corresponding to an input syllable but also for the element corresponding to a similar syllable, and is different from a pronunciation state acoustic score vector (pronunciation state output probability vector) that uses only 0 and 1 as elements, as described above. That is, in the pronunciation state acoustic score vector described in connection with the first embodiment, only the value of the element corresponding to an input syllable is set to 1. On the other hand, in the acoustic score vector described in connection with the modification, the value of the element corresponding to an input syllable and the value of the element corresponding to a syllable similar to the input syllable are large, so that the acoustic score vector described in connection with the modification can resemble a vector generated in actual speech recognition processing.

Second Embodiment

Next, the second embodiment will be described with reference to FIGS. 11 to 15. As compared with the first embodiment or the modification thereof, the second embodiment is featured in that a difference extracted by the comparison unit 40 is processed additionally. For example, unlike the first embodiment in which a difference is only extracted and displayed, the second embodiment converts an extracted difference into a word-based difference and displays it. Further, the second embodiment corrects the range of displayed word candidates, so that the quality of word extraction can be expected to increase.

FIG. 11 is a block diagram illustrating the configuration of a difference extraction device 1 according to the second embodiment. Components similar to those described above are designated by the same reference symbols, and detailed description such components will be omitted and different features will be mainly described. In the embodiments set forth below, redundant descriptions will be omitted.

The difference extraction device 1 further includes a word estimation unit 50 and an instruction unit 80 in addition to the components illustrated in FIG. 1.

The word estimation unit 50 estimates a notation of a word candidate contained in an input notation string and including a difference extracted by the comparison unit 40, based on an analysis result of the input notation string obtained by the morphological analysis unit 21. The analysis result of the input notation string is, for example, a result of the morphological analysis performed by the morphological analysis unit 21.

The display control unit 70 causes the display 71 to display an input notation string including word candidates estimated by the word estimation unit 50.

The instruction unit 80 indicates a range of a notation contained in the input notation string displayed on the display 71 and including at least part of word candidates. For example, the instruction unit 80 may instruct the range of the notation in response to the user's operation of the keyboard or the mouse (not shown). This is not restrictive, and the instruction unit 80 may instruct the range of the notation in response to the operation of another input device, such as a touch panel.

Figure 12:
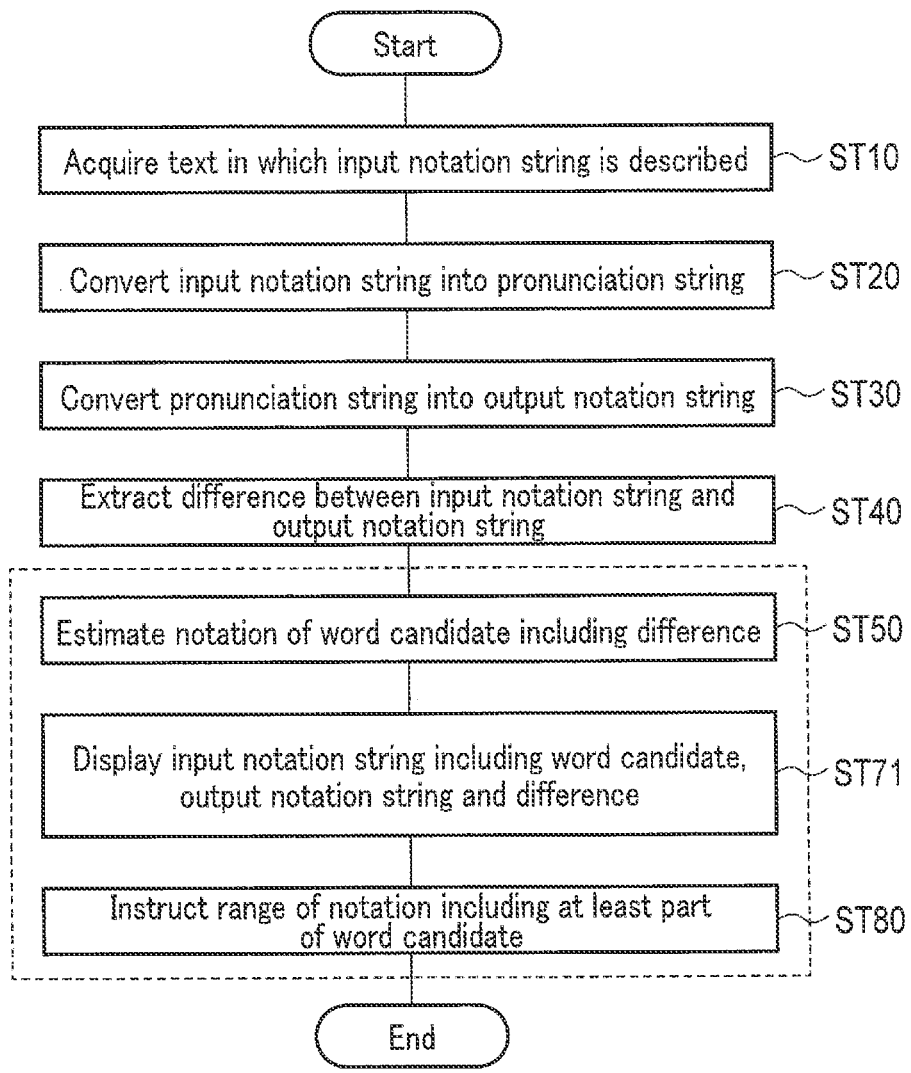
FIG. 12 is a flowchart for illustrating how an operation is performed in the second embodiment.
Figure 13:
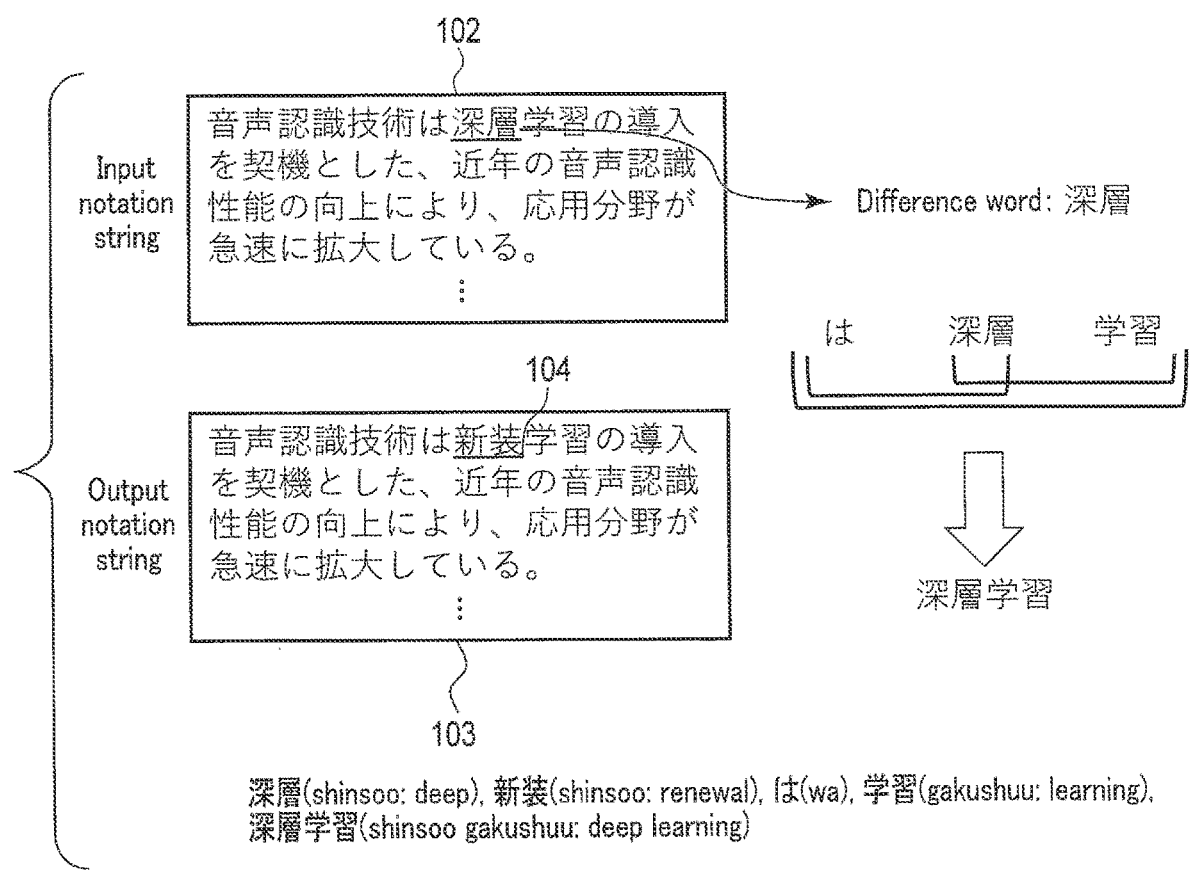
FIG. 13 is a schematic diagram for illustrating a word estimation unit used in the second embodiment.

Next, how the difference extraction device configured as described above operates will be described with reference to the flowchart of FIG. 12 and the schematic views of FIGS. 13 to 15.

Let us assume that steps ST10 to ST40 are executed in the same manner as described above, and that a difference between the input notation string and the output notation string is extracted.

In step ST50, the word estimation unit 50 estimates a notation of a word candidate contained in the input notation string and including a difference, based on the analysis result of the input notation string. Specifically, the word estimation unit 50 extracts a character string that can be estimated to form a word by concatenating adjacent morphemes of a extracted by the comparison unit 40, and outputs the extracted character string as a word candidate. Specifically, as illustrated in FIG. 13, the word estimation unit 50 assumes that the difference is "深層" (shinsoo: deep) and confirms whether or not the difference constitutes a word together with the characters before and after it. In this case, the character "は" (wa) is present before the difference and the word "学習" (gakushuu: learning) is present after the difference, so that there is a possibility that the difference forms a word together with the character after it. Therefore, the word estimation unit 50 estimates "深層 学習" (shinsoo gakushuu: deep learning) as a word candidate. In order to determine character strings constituting a word in this way, for example, the rule "the concatenated part of 'noun-general' is presumed to be a word" or the like is used. Further, the word estimation unit 50 may use not only the rule which uses one morphological analysis result but also another rule which estimates a word candidate by concatenating a plurality of morphemes that frequently appear in the adjacent portions, based on the results of a large amount of morphological analysis.

In step ST71, as illustrated in FIG. 14, the display control unit 70 causes the display 71 to display a notation string acquired by the text acquisition unit 10 and a notation string output by the notation string conversion unit 30 such that the former notation string is arranged on the input notation string display screen 102 and the latter notation string is arranged on the output notation string display screen 103. Further, the display control unit 70 causes the display 71 to display a notation including a difference with the display attribute 104, based on the difference extracted by the comparison unit 40 and the word candidate estimated by the word estimation unit 50. In this state, the notation including the difference can be registered in the word dictionary 35 as appropriate in response to the user's operation of the keyboard, mouse or the like. Registration to the word dictionary 35 can be made after the next step ST80.

In step ST80, the instruction unit 80 uses the cursor 400, the word candidate screen 401, the word candidate 402 and the range correction button 403. The instruction unit 80 can change the range of the word by changing the range of the display attribute 104 of the display control unit 70 in response to the user's operation.

Specifically, as illustrated in FIG. 15, when the instruction unit 80 moves the cursor 400 to the display attribute 104 of the input notation string display screen 102, the word candidate screen 401 opens and word candidates 402 are displayed (Step ST80-1).

The instruction unit 80 moves the cursor 400 onto the word candidate 402 to select a candidate, and changes the range of the display attributes 104 of the input notation string display screen 102 and the output notation string display screen 103 (step ST80-2). For example, the instruction unit 80 moves the cursor 400 onto the word candidate notation "ペンロ—ズ" (penroozu: Penrose), and selects "ムーア・ペンロ—ズ" (muua penroozu: Moore Penrose) from the word candidate 402 in the word candidate screen 401. Thus, the instruction unit 80 changes the range of the display attribute 104 from the word candidate notation "ペンロ—ズ" (penroozu: Penrose) to the range "ムーア・ペンロ—ズ" (muua penroozu: Moore Penrose) including all of the notation. This example is not restrictive, and the instruction unit 80 may place the cursor 400 on the word candidate notation "ペンロ—ズ" (penroozu: Penrose) and select either "ペン" (pen: Pen) or "ロ—ズ" (roozu: rose) from the word candidates 402 in the word candidate screen 401. Thus, the instruction unit 80 changes the range of the display attribute 104 from the word candidate notation "ペンロ—ズ" (penroozu: Penrose) to the range "ペン" (pen: Pen) or "ロ—ズ" (roozu: rose) including part of the notation.

Alternatively, the instruction unit 80 selects the range correction button 403 and changes the range of the display attribute 104 using the cursor 400. For example, the instruction unit 80 selects the range correction button 403 and moves the cursor 400 in accordance with the user's operation of the mouse 81 to expand the range "ペンロ—ズ" (penroozu: Penrose), thereby selecting the range "ムーア・ペンロ—ズ" (muua penroozu: Moore Penrose). This is not restrictive, and the instruction unit 80 selects the range correction button 403, moves the cursor 400 in accordance with the user's operation of the mouse 81, and narrows the range of the display attribute 104 from the word candidate notation "ペンロ—ズ" (penroozu: Penrose) to the range "ペン" (pen: Pen) or "ロ—ズ" (roozu: rose) that includes part of the notation.

As a result of step ST80-2 or ST80-2a, for example, the display attribute 104 of the input notation string display screen 102 is "ムーア・ペンロ—ズ" (muua penroozu: Moore Penrose) (step ST80-3), and the display attribute 104 the output notation string display screen 103 is "ムーア・P e n r o s e" (muua Penrose: Moore Penrose). Further, where the range of the display attribute 104 of the input notation string display screen 102 becomes "ペン" (pen: Pen) or "ロ—ズ" (roozu: rose), the range of the display attribute 104 of the output notation string display screen 103 is changed to "Pen" or "rose".

As described above, in the second embodiment, the analysis unit analyzes the input notation string. The word estimation unit estimates a notation of a word candidate contained in the input notation string and including a difference, based on the analysis result of the input notation string. Therefore, even if a compound word consisting of the difference and the noun connected thereto is an unknown word, the configuration that can estimate the notation of the word candidate including the difference can estimate that unknown word as a word candidate. This is an advantage obtained in addition to the advantages of the first embodiment.

Moreover, according to the second embodiment, the display control unit causes the input notation string including the word candidate to be displayed on the display. The instruction unit indicates a range of a notation contained in the displayed input notation string and including at least part of word candidate. Therefore, it can be expected that the configuration capable of modifying the range of estimated word candidate can improve the quality of word extraction.

Third Embodiment

Next, the third embodiment will be described with reference to FIGS. 16 to 21. In the third embodiment, a word type is determined for the word candidate estimated in the second embodiment, and the word candidate is displayed using the display attribute corresponding to the word type. Further, in the third embodiment, the displayed word candidate can be registered in the word dictionary 35, and the registered result may be reflected in what is displayed.

FIG. 16 is a block diagram illustrating a process performed by the difference extraction device 1 of the third embodiment. The difference extraction device 1 further includes a word type determination unit 60 and a word registration unit 90 in addition to the components illustrated in FIG. 11. The word type determination unit 60 may include an unknown word determination unit 61 and a notation fluctuation determination unit 62.

The word type determination unit 60 determines a word type of a word candidate estimated by the word estimation unit 50. For example, the word type determination unit 60 may operate such that the word type of the word candidate estimated by the word estimation unit 50 is determined as an unknown word by the unknown word determination unit 61. Alternatively, for example, the word type determination unit 60 may operate such that the word type of the word candidate estimated by the word estimation unit 50 is determined as a notation fluctuation by the notation fluctuation determination unit 62. This example is not restrictive, and the word type determination unit 60 can be used for various types indicating a word notation. For example, the word type determination unit 60 can estimate various types such as a proper noun and a verb.

If the notation of the word candidate estimated by the word estimation unit 50 is not registered in the word dictionary 35, the unknown word determination unit 61 determines the notation of the word candidate as an unknown word.

Where the notation of the word candidate estimated by the word estimation unit 50 and the notation in the output notation string corresponding to the notation of the word candidate are different notations of the same word, the notation fluctuation determination unit 62 determines that the two different notations are caused by a notation fluctuation. The determination of the notation fluctuation can be executed, for example, depending on whether or not the two notations are in a different notation dictionary. The different notation dictionary is a dictionary that describes different notations of the same word. The "different notation dictionary" may be referred to as "different notation information" or "notation fluctuation determination information".

The display control unit 70 causes the notation of the word candidate to be displayed on the display 71 by using the display attribute corresponding to the word type determined by the word type determination unit 60.

The word registration unit 90 registers the notation in the range instructed by the instruction unit 80 in the word dictionary 35.

Figure 17:
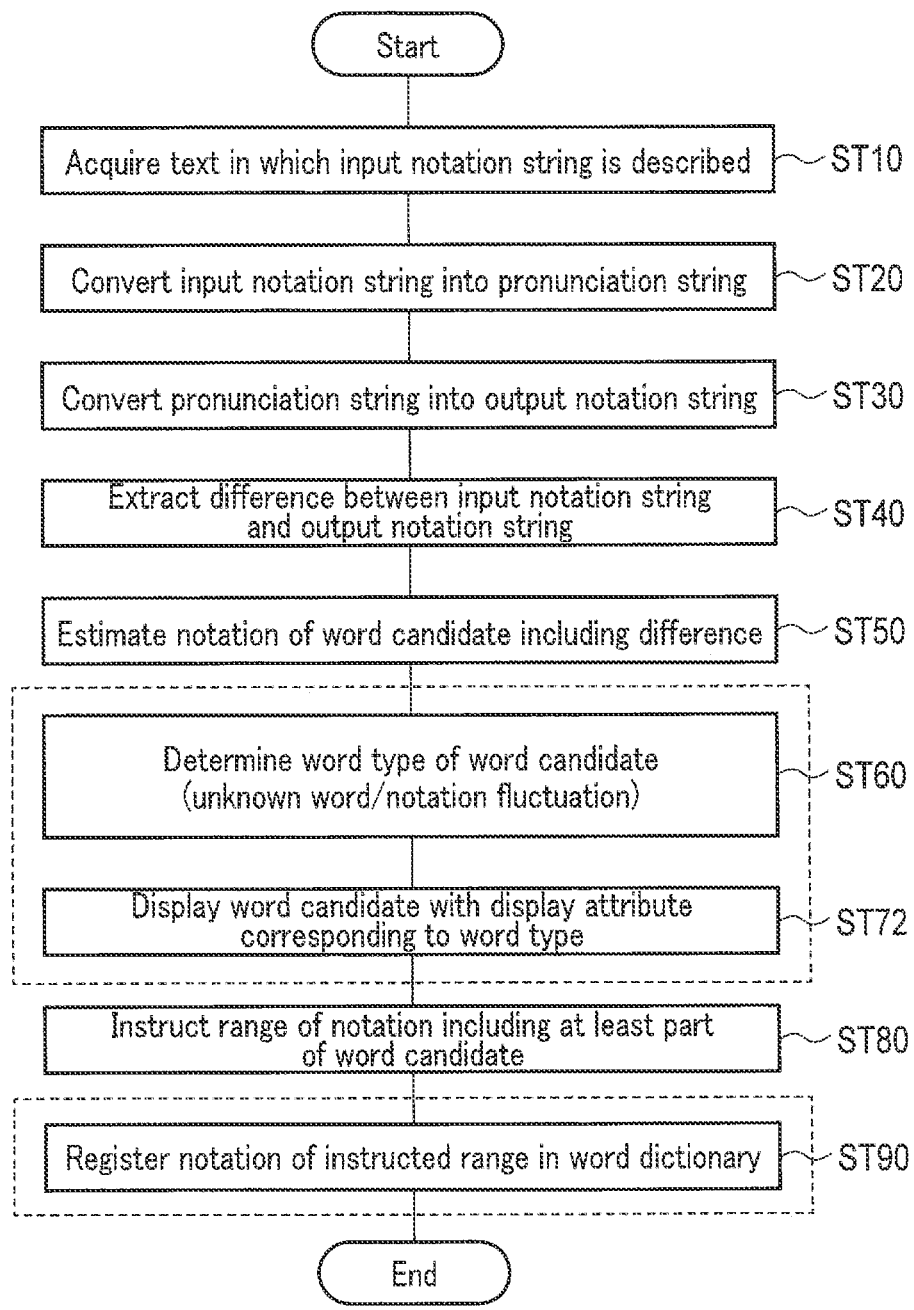
FIG. 17 is a flowchart for illustrating how an operation is performed in the third embodiment.

Next, how the difference extraction device configured as described above operates will be described with reference to the flowchart of FIG. 17 and the schematic views of FIGS. 18 to 21.

Let us assume that steps ST10 to ST50 are executed in the same manner as described above, and that the notation of word candidates including the difference is estimated.

In step ST60, the word type determination unit 60 causes both the unknown word determination unit 61 and the notation fluctuation determination unit 62 to operate in parallel. If the notation of the word candidate estimated in step ST50 is not registered in the word dictionary 35, the unknown word determination unit 61 performs a process of determining an unknown word. For example, where the notation of "ペンローズ" (penroozu: Penrose) is estimated as a word candidate based on the difference between the input notation string and the output notation string, the word candidate notation "ペンローズ" (penroozu: Penrose) is not included in the word dictionary 35 and is therefore determined as an unknown word.

Where the notation of the word candidate estimated in step ST50 and the notation in the output notation string corresponding to the notation of the word candidate are different notations of the same word, the notation fluctuation determination unit 62 performs a process of determining a notation fluctuation. For example, where the input notation string "所" (tokoro: place, part) and the corresponding output notation string "ところ" (tokoro: part, place) are present, the word candidate is estimated as "所" (tokoro: place, part) based on the difference between the two notation strings. If the estimated word candidate notation "所" (tokoro: place, part) and the notation "ところ" (tokoro: part, place) in the corresponding output notation string are included in the different notation dictionary, they are different notations of the same word and are therefore determined as a notation fluctuation.

Figure 18:
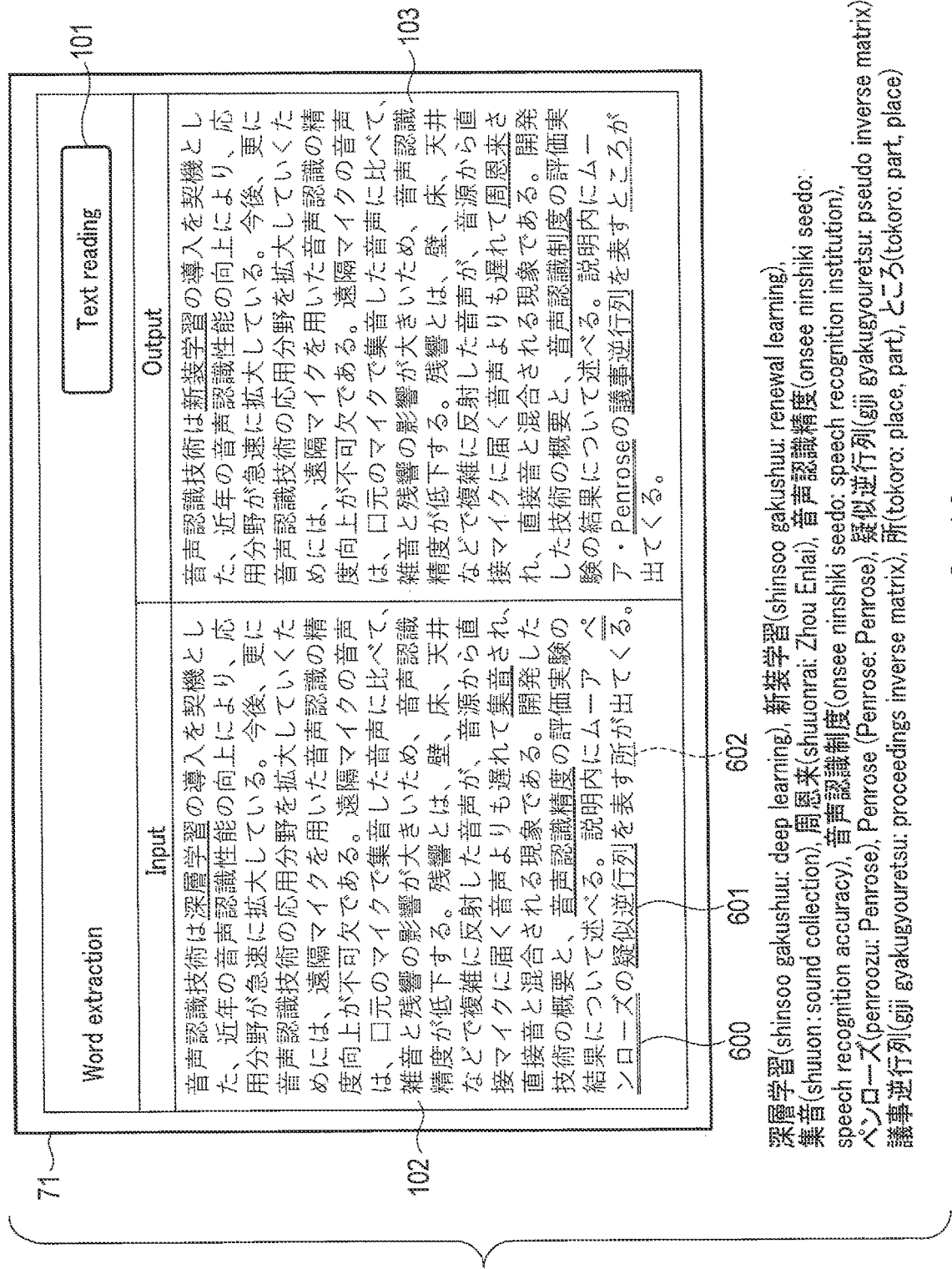
FIG. 18 is a schematic diagram illustrating how an example of a display screen is in the third embodiment.

In step ST72, as illustrated in FIG. 18, the display control unit 70 causes the display 71 to display the notations of the differences with the display attributes 600 to 602 corresponding to the word types, based on the extracted differences, the estimated word candidates and the word types. In this example, "ペンローズ" (penroozu: Penrose) is determined as an unknown word, and "所" (tokoro: place, part) is determined as a notation fluctuation, so that "ペンローズ" (penroozu: Penrose) is shown with a double-line display attribute 600, "所" (tokoro: place, part) is shown with a dotted-line display attribute 602, and other words are shown with a solid-line display attribute 601. In this example, the display attributes are a double-line display attribute 600, a dotted-line display attribute 602 and a solid-line display attribute 601, but the display attributes are not limited to these, and any character decoration can be used in accordance with a word type. As modified examples of display attributes, highlight density, character size, font, color, bold, italic, and predetermined symbols (e.g., a black triangle) placed before and after a character can be used as appropriate.

After step ST72, step ST80 is executed as appropriate. It should be noted that step ST80 is omitted in the absence of a user's operation.

Figure 19:
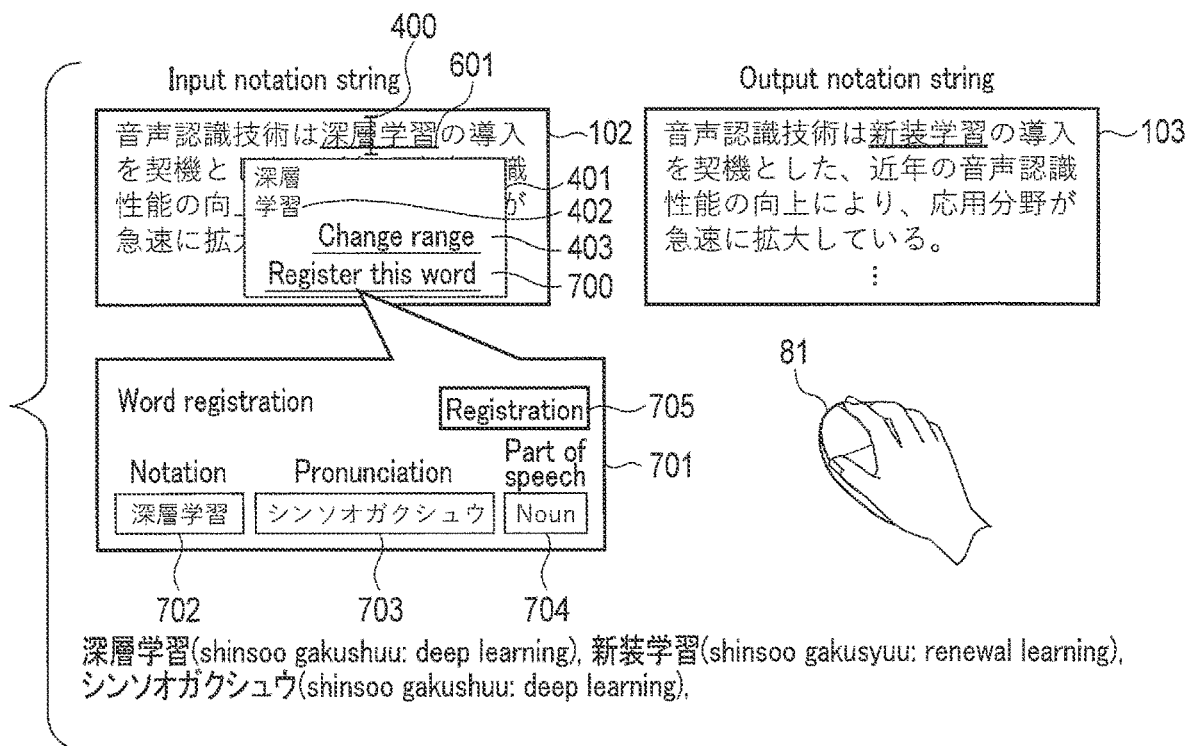
FIG. 19 is a schematic diagram illustrating an example of how a registration is made by a word registration unit of the third embodiment.

In step ST90, the word registration unit 90 executes a word registration process, using a word candidate screen 401 and a word registration screen 701, as illustrated in FIG. 19. The word candidate screen 401 is a screen including a word candidate 402, a range correction button 403 and a word registration button 700. The word registration screen 701 is displayed by operating the word registration button 700, and includes a notation input box 702, a pronunciation registration box 703, a part-of-speech registration box 704 and a registration button 705.

For example, when the cursor 400 is moved onto the display attribute 601 in response to the user's operation of the mouse 81, the word candidate screen 401 opens, and when the word registration button 700 is depressed, the word registration screen 701 opens. On the word registration screen 701, the notation, pronunciation and part of speech for a word in the range of the display attribute 601 are entered into the notation input box 702, the pronunciation registration box 703, and the part-of-speech registration box 704, respectively, and the registration button 705 is depressed to register the word in the word dictionary 35. In this example, the notation input box 702, the pronunciation registration box 703 and the part-of-speech registration box 704 are used, but the notation, reading and part of speech may be automatically entered after the word registration button 700 is depressed.

Figure 20:
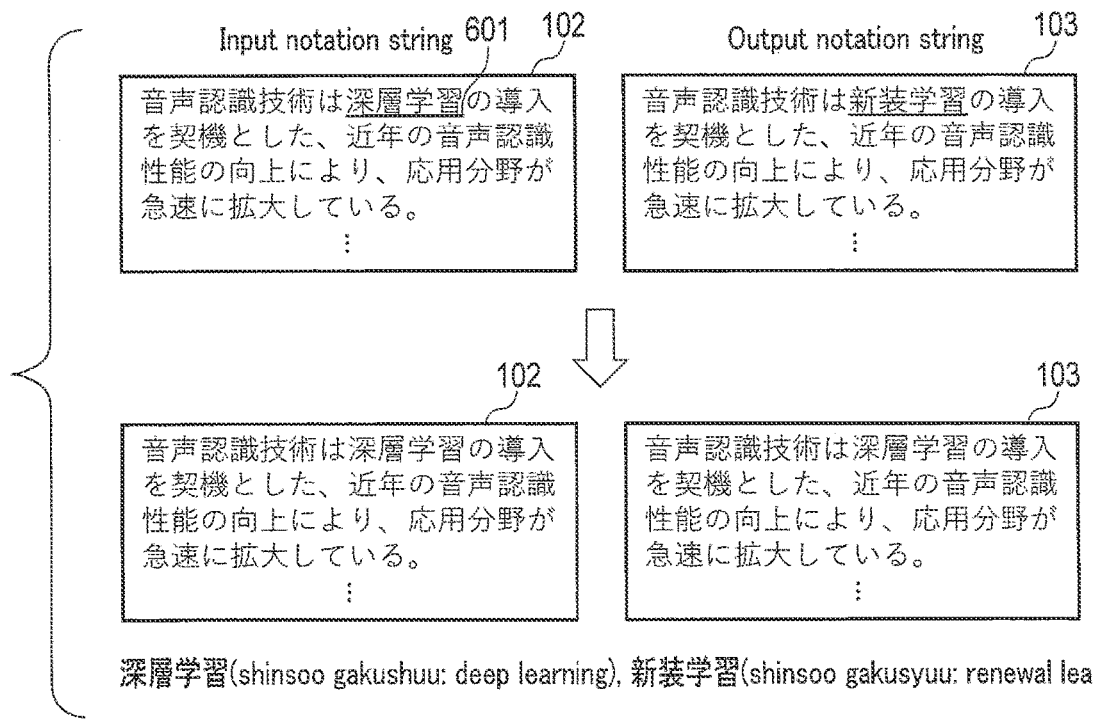
FIG. 20 is a schematic view illustrating an example of what is displayed where registration is reflected in the third embodiment.

As illustrated in FIG. 20, the word registration unit 90 may be designed such that the notation string conversion unit 30, the comparison unit 40, the word estimation unit 50, the word type determination unit 60 and the display control unit 70 can be operated manually or operate automatically, to reflect the registered words on the display screen. The lower portion of FIG. 20 illustrates an updated input notation string display screen 102 and an updated output notation string display screen 103. After "深層学習" (shinsoo gakushuu: deep learning) is registered in the word dictionary 35 by the word registration unit 90, such a word registration reflection process as illustrated is executed, and "深層学習" (shinsoo gakushuu: deep learning) is displayed on the output notation string display screen 103. Therefore, difference extraction is not performed by the comparison unit 40, and the display attribute 601 is not displayed.

As illustrated in FIG. 21, the word registration unit 90 may display a word registration screen 800 on the display 71 for collectively registering a plurality of words. On the word registration screen 800, word candidates estimated by the word estimation unit 50 and words in the input notation string of the input notation string display screen 102 corresponding to the difference of word candidates in the range instructed by the instruction unit 80 are displayed as a plurality of words to be registered in the word dictionary 35. On the valid display 801 in the word registration screen 800, a word to be registered can be specified. By depressing the registration button 802 in the word registration screen 800, the word registration unit 90 can collectively register the words that are made valid in the valid display 801 in the word dictionary 35.

In FIG. 21, the valid display 801 is a check box, but this example is not restrictive and various display forms can be used. For example, various display forms such as a circle mark, a cross mark and a fill mark may be used instead of the check box. In addition, in the example illustrated in FIG. 21, the notation input box 702, the pronunciation registration box 703, and the part-of-speech registration box 704 are automatically input, but the user may manually input them. In any case, step ST90 ends by registering words in the word dictionary 35.

As described above, according to the third embodiment, the word type determination unit 60 determines the word type of a word candidate. Therefore, whether or not a word type requires the registration of a word candidate can be determined before the word candidate is actually registered. This is an advantage obtained in addition to the advantages of the second embodiment.

Moreover, according to the third embodiment, the display control unit 70 causes the display to display the notation of the word candidate by using the display attribute corresponding to the word type. In this case, before the user registers the word candidate, a determination of whether or not the word candidate needs to be registered can be assisted.

According to the third embodiment, the word registration unit 90 may register the notation of the instructed range in the word dictionary. In this case, the notation confirmed by the user can be registered in the word dictionary.

According to the third embodiment, the unknown word determination unit 61 of the word type determination unit 60 can determine that the notation of the word candidate is an unknown word if the notation of the word candidate is not registered in the word dictionary. In this case, unknown words which are among the word candidates and which are not registered in the word dictionary can be accurately detected.

According to the third embodiment, where the notation of a word candidate and the notation in the output notation string corresponding to the notation of the word candidate are different notations of the same word, the notation fluctuation determination unit 62 of the word type determination unit 60 can determine that the two different notations are caused by notation fluctuations. In this case, words which are among the word candidates and which correspond to the notation fluctuations and therefore do not have to be newly registered in the word dictionary can be detected.

Fourth Embodiment

FIG. 22 is a block diagram illustrating the hardware configuration of a difference extraction device according to the fourth embodiment. The fourth embodiment is a specific example of the first to third embodiments, and is an embodiment in which the difference extraction device 1 is realized by a computer.

The difference extraction device 1 includes a CPU (Central Processing Unit) 2, a RAM (Random Access Memory) 3, a program memory 4, an auxiliary storage device 5 and an input/output interface 6 as hardware elements. The CPU 2 communicates with the RAM 3, the program memory 4, the auxiliary storage device 5 and the input/output interface 6, via a bus. That is, the difference extraction device 1 of the present embodiment is realized by a computer having the above-mentioned hardware configuration.

The CPU 2 is an example of a general-purpose processor. The RAM 3 is used as a working memory by the CPU 2. The RAM 3 includes a volatile memory such as an SDRAM (Synchronous Dynamic Random Access Memory). The program memory 4 stores a program for realizing each unit or component of each embodiment. This program may be, for example, a program for realizing each of the following functions on the computer: [1] the function to acquire a text in which an input notation string is described; [2] the function to convert an input notation string into a pronunciation string; [3] the function to convert the pronunciation string into an output notation string; and [4] the function to compare the input notation string and the output notation string and extract a difference therebetween. As the program memory 4, for example, a ROM (Read-Only Memory), a portion of the auxiliary storage device 5, or a combination of these is used. The auxiliary storage device 5 stores data in a non-temporary manner. The auxiliary storage device 5 includes a nonvolatile memory such as a hard disc drive (HDD) or a solid state drive (SSD).

The input/output interface 6 is an interface for connection to another device. The input/output interface 6 is used, for example, for connection to a keyboard, a mouse 81 and a display 71.

The program stored in the program memory 4 includes computer-executable instructions. When the program (computer executable instruction) is executed by the CPU 2, which is a processing circuit, it causes the CPU 2 to execute predetermined processes. For example, when the program is executed by the CPU 2, it causes the CPU 2 to execute a series of processes described in relation to the elements illustrated in FIGS. 1, 9, 11 and 16. For example, when the computer-executable instruction included in the program is executed by the CPU 2, it causes the CPU 2 to execute a difference extraction method. The difference extraction method may include a step corresponding to each of the above functions [1] to [4]. Further, the difference extraction method may appropriately include the steps illustrated in FIGS. 5, 10, 12, and 17.

The program may be provided to the difference extraction device 1, which is a computer, in a state in which the program is stored in a computer-readable storage medium. In this case, the difference extraction device 1 further includes, for example, a drive (not shown) for reading data from the storage medium, and acquires a program from the storage medium. As the storage medium, for example, a magnetic disk, an optical disk (CD-ROM, CD-R, DVD-ROM, DVD-R, etc.), a photomagnetic disk (MO, etc.), a semiconductor memory or the like can be used as appropriate. The storage medium may be referred to as a non-transitory computer readable storage medium. Alternatively, the program may be stored in a server on a communication network such that the difference extraction device 1 can download the program from the server using the input/output interface 6.

The processing circuit for executing the program is not limited to a general-purpose hardware processor such as a CPU 2, and a dedicated hardware processor such as an ASIC (Application Specific Integrated Circuit) may be used. The term "processing circuit (processing unit)" covers at least one general-purpose hardware processor, at least one dedicated hardware processor, or a combination of at least one general purpose hardware processor and at least one dedicated hardware processor. In the example illustrated in FIG. 22, the CPU 2, the RAM 3 and the program memory 4 correspond to the processing circuit.

According to at least one embodiment described above, unknown words that present correct notations without registration are prevented from being unnecessarily registered.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A difference extraction device comprising processing circuitry configured to:
   acquire a text in which an input notation string is described;
   convert the input notation string into a pronunciation string;
   convert the pronunciation string into an output notation string;
   extract a difference by comparing the input notation string and the output notation string with each other, and determining, as the difference, based on a result of the comparison, a part of the output notation string which differs from a part of the input notation string, wherein said parts are respectively located at corresponding positions in the input notation string and the output notation string;
   analyze the input notation string;
   estimate a notation of a word candidate contained in the input notation string and including the difference, based on an analysis result of the input notation string; and
   determine a word type of the word candidate,
   wherein:
   where the notation of the word candidate is estimated, the processing circuitry extracts, from the input notation string, a character string estimated to form a word by concatenating the difference and at least one character adjacent to the difference, and outputs the extracted character string as the estimated notation of the word candidate,
   where the word type of the word candidate is determined, the processing circuitry determines, using a different notation dictionary which is a dictionary listing different notations of a same word with a same meaning, if two notations including the notation of the word candidate and the notation in the output notation string corresponding to the notation of the word candidate are present in the different notation dictionary, that the two notations are caused by a notation fluctuation,
   where the pronunciation string is converted into the output notation string,
   the processing circuitry is further configured to:
   convert the pronunciation string into an acoustic score vector;
   store a language model and a word dictionary for speech recognition in a memory; and
   generate a second pronunciation string from the acoustic score vector and convert the generated second pronunciation string into the output notation string, using the language model and the word dictionary,
   wherein the acoustic score vector is a 102-dimensional vector representing a likelihood of each of syllables included in the pronunciation string that is in a Japanese language, a pronunciation of each of the syllables being expressed by a single state, the Japanese language including 102 syllables, and
   wherein the processing circuitry is further configured to execute a display control process in which the input notation string including the word candidate is displayed on a display and in which the notation of the word candidate is displayed on the display, using a display attribute based on the word candidate.

2. The difference extraction device according to claim 1, wherein, in the display control process, the processing circuitry is further configured to:
   indicate a range of a notation contained in the displayed input notation string and including at least part of the word candidate.

3. The difference extraction device according to claim 1, wherein in the display control process, the notation of the word candidate is displayed on the display using the display attribute, the display attribute corresponding to the word type.

4. The difference extraction device according to claim 2, wherein the processing circuit is further configured to register the notation of the indicated range in a word dictionary.

5. The difference extraction device according to claim 1, wherein
where the notation of the word candidate is not registered in a word dictionary, the processing circuitry is further configured to determine that the notation of the word candidate is an unknown word.

6. The difference extraction device according to claim 1, wherein
where the pronunciation string is converted into the acoustic score vector, the processing circuitry is further configured to synthesize an audio signal from the pronunciation string, calculate an acoustic feature vector from the audio signal, and calculate an acoustic score vector from the acoustic feature vector.

7. The difference extraction device according to claim 1, wherein
where the input notation string is converted into the pronunciation string, the processing circuitry is further configured to divide the input notation string into words, perform a morphological analysis for estimating part of speech of each word, and convert the words into the pronunciation string, with readings attached thereto, based on a result of the morphological analysis.

8. A difference extraction method comprising:
acquiring a text in which an input notation string is described;
converting the input notation string into a pronunciation string;
converting the pronunciation string into an output notation string;
extracting a difference by comparing the input notation string and the output notation string with each other, and determining, as the difference, based on a result of the comparison, a part of the output notation string which differs from a part of the input notation string, wherein said parts are respectively located at corresponding positions in the input notation string and the output notation string;
analyzing the input notation string;
estimating a notation of a word candidate contained in the input notation string and including the difference, based on an analysis result of the input notation string; and
determining a word type of the word candidate,
wherein:
where the notation of the word candidate is estimated, the method further comprises extracting, from the input notation string, a character string estimated to form a word by concatenating the difference and at least one character adjacent to the difference, and outputting the extracted character string as the estimated notation of the word candidate,
where the word type of the word candidate is determined, the method further comprises determining, using a different notation dictionary which is a dictionary listing different notations of a same word with a same meaning, if two notations including the notation of the word candidate and the notation in the output notation string corresponding to the notation of the word candidate are present in the different notation dictionary, that the two notations are caused by a notation fluctuation, where the pronunciation string is converted into the output notation string, the method further comprises:
converting the pronunciation string into an acoustic score vector;
storing a language model and a word dictionary for speech recognition in a memory; and
generating a second pronunciation string from the acoustic score vector and converting the generated second pronunciation string into the output notation string, using the language model and the word dictionary,
wherein the acoustic score vector is a 102-dimensional vector representing a likelihood of each of syllables included in the pronunciation string that is in a Japanese language, a pronunciation of each of the syllables being expressed by a single state, the Japanese language including 102 syllables, and
wherein the method further comprises executing a display control process in which the input notation string including the word candidate is displayed on a display and in which the notation of the word candidate is displayed on the display, using a display attribute based on the word candidate.

9. A non-transitory computer readable storage medium including computer executable instructions, wherein the instructions, when executed by a processor, cause the processor to perform a method comprising:
acquiring a text in which an input notation string is described;
converting the input notation string into a pronunciation string;
converting the pronunciation string into an output notation string; and
extracting a difference by comparing the input notation string and the output notation string with each other, and determining, as the difference, based on a result of the comparison, a part of the output notation string which differs from a part of the input notation string, wherein said parts are respectively located at corresponding positions in the input notation string and the output notation string;
analyzing the input notation string;
estimating a notation of a word candidate contained in the input notation string and including the difference, based on an analysis result of the input notation string; and
determining a word type of the word candidate,
wherein:
where the notation of the word candidate is estimated, the method further comprises extracting, from the input notation string, a character string estimated to form a word by concatenating the difference and at least one character adjacent to the difference, and outputting the extracted character string as the estimated notation of the word candidate,
where the word type of the word candidate is determined, the method further comprises determining, using a different notation dictionary which is a dictionary listing different notations of a same word with a same meaning, if two notations including the notation of the word candidate and the notation in the output notation string corresponding to the notation of the word candidate are present in the different notation dictionary, that the two notations are caused by a notation fluctuation, where the pronunciation string is converted into the output notation string, the method further comprises:

converting the pronunciation string into an acoustic score vector;

storing a language model and a word dictionary for speech recognition in a memory; and generating a second pronunciation string from the acoustic score vector and converting the generated second pronunciation string into the output notation string, using the language model and the word dictionary, wherein the acoustic score vector is a 102-dimensional vector representing a likelihood of each of syllables included in the pronunciation string that is in a Japanese language, a pronunciation of each of the syllables being expressed by a single state, the Japanese language including 102 syllables, and wherein the method further comprises executing a display control process in which the input notation string including the word candidate is displayed on a display and in which the notation of the word candidate is displayed on the display, using a display attribute based on the word candidate.

* * * * *